United States Patent
Campagna et al.

(10) Patent No.: US 10,230,525 B2
(45) Date of Patent: Mar. 12, 2019

(54) PUBLIC KEY ROLLUP FOR MERKLE TREE SIGNATURE SCHEME

(71) Applicant: Amazon Technologies, Inc., Seattle, WA (US)

(72) Inventors: Matthew John Campagna, Bainbridge Island, WA (US); Eric Jason Brandwine, Haymarket, VA (US); Andrew Kyle Driggs, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/389,686

(22) Filed: Dec. 23, 2016

(65) Prior Publication Data

US 2018/0183592 A1    Jun. 28, 2018

(51) Int. Cl.
| | |
|---|---|
| *H04L 9/30* | (2006.01) |
| *H04L 9/06* | (2006.01) |
| *H04L 9/08* | (2006.01) |
| *H04L 9/14* | (2006.01) |
| *H04L 9/32* | (2006.01) |

(52) U.S. Cl.
CPC .............. *H04L 9/30* (2013.01); *H04L 9/0643* (2013.01); *H04L 9/0861* (2013.01); *H04L 9/14* (2013.01); *H04L 9/3247* (2013.01)

(58) Field of Classification Search
CPC ....................................................... H04L 9/836
USPC ......................................................... 713/176
See application file for complete search history.

(56) References Cited

U.S. PATENT DOCUMENTS

| | | | |
|---|---|---|---|
| 5,432,852 A | * | 7/1995 | Leighton ............... H04L 9/3236 380/30 |
| 6,701,434 B1 | | 3/2004 | Rohatgi |
| 7,373,503 B2 | | 5/2008 | Nakano et al. |
| 9,049,185 B1 | | 6/2015 | Papadopoulos et al. |
| 2002/0107814 A1 | | 8/2002 | Micali |

(Continued)

OTHER PUBLICATIONS

U.S. Appl. No. 15/390,176, filed Dec. 23, 2016.

(Continued)

*Primary Examiner* — Jacob Lipman
(74) *Attorney, Agent, or Firm* — Davis Wright Tremaine LLP

(57) ABSTRACT

An organizational signature authority delegates signature authority to one or more subordinate signature authorities by rolling up public keys from the subordinate signature authorities into a public key for the organization. A subordinate signature authority of the organizational signature authority generates cryptographic keys for use by the subordinate signature authority, and cryptographically derives a public key for the subordinate signature authority based at least in part on the cryptographic keys. In some examples, the subordinate signature authority acquires public keys from a lower subordinate signature authority, and the public key of the subordinate signature authority is cryptographically derived in part from the public key of the lower subordinate signature authority. The public key of the subordinate signature authority is provided to the organizational signature authority. A hash tree is generated from the public keys of the subordinate signature authorities to create the public key for the organization.

23 Claims, 16 Drawing Sheets

(56) References Cited

U.S. PATENT DOCUMENTS

| | | | |
|---|---|---|---|
| 2004/0107341 | A1 | 6/2004 | Hall et al. |
| 2005/0036615 | A1* | 2/2005 | Jakobsson ............. H04L 9/3234 380/255 |
| 2009/0070361 | A1 | 3/2009 | Haber et al. |
| 2013/0083926 | A1 | 4/2013 | Hughes et al. |
| 2015/0295720 | A1 | 10/2015 | Buldas et al. |
| 2016/0253523 | A1* | 9/2016 | Kroonmaa ............. G06F 21/64 726/26 |
| 2017/0289151 | A1 | 10/2017 | Shanahan et al. |
| 2017/0357496 | A1* | 12/2017 | Smith ...................... G06F 8/65 |

OTHER PUBLICATIONS

U.S. Appl. No. 15/390,205, filed Dec. 23, 2016.
U.S. Appl. No. 15/390,214, filed Dec. 23, 2016.
U.S. Appl. No. 15/389,771, filed Dec. 23, 2016.
Bare, "Attestation and Trusted Computing," University of Washington, Washington, Mar. 2006.
Becker, "Merkle Signature Schemes, Merkle Trees and Their Cryptanalysis," Technical Report [Seminararbeit], Ruhr-University Bochum, Jul. 18, 2008, 28 pages.
Buchmann et al., "On the Security of the Winternitz One-Time Signature Scheme: Full Version," International Conference on Cryptology in Africa, Jul. 5, 2011, 17 pages.
Campagna et al., "Quantum Safe Cryptography V1.0.0 (Oct. 2014): Quantum Safe Cryptography and Security; An Introduction, benefits, enablers and challenges," European Telecommunications Standards Institute White Paper, ISBN 979-10-92620-03-0, Oct. 1, 2014, 49 pages.
Cooper, et al., "Internet X.509 Public Key Infrastructure Certificate and Certificate Revocation List (CRL) Profile," Request for Comments: 5280, Standards Track, 141 pages.
Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.
McGrew et al., "Hash-Based Signatures: draft-mcgrew-hash-sigs-02," Crypto Forum Research Group Internet-Draft, Jul. 4, 2014, 52 pages.
McGrew et al., "Hash-Based Signatures: draft-mcgrew-hash-sigs-06," Crypto Forum Research Group Internet-Draft, Mar. 5, 2017, 25 pages.
Menezes et al., Handbook of Applied Cryptography, CRC Press, 1997, ISBN 0-8493-8523-7, 794 pages.
Santesson et al., "X.509 Internet Public Key Infrastructure Online Certificate Status Protocol—OCSP," Request for Comments 6960, Standards Track, Jun. 2013, 41 pages.
Wikipedia, "Lamport Signature," page last modified Oct. 13, 2016, retrieved Dec. 16, 2016, https://en.wikipedia.org/wiki/Lamport_signature, 5 pages.
Wikipedia, "Merkle Signature Scheme," page last modified Sep. 23, 2016, retrieved Dec. 16, 2016, https://en.wikipedia.org/wiki/Merkle_signature_scheme, 3 pages.
Wikipedia, "Merkle Tree," retreived Jul. 12, 2012, from https://en.wikipedia.org/w/index.php?title=Merkle_tree&oldid=499247620, 4 pages.
Elwailly et al., "QuasiModo: Efficient Certificate Validation and Revocation," International Workshop on Public Key Cryptography, Feb. 26, 2004, 14 pages.
International Search Report and Written Opinion dated Mar. 26, 2018, International Patent Application No. PCT/US2017/067978, filed Dec. 21, 2017, 14 pages.
International Search Report and Written Opinion dated Mar. 26, 2018, International Patent Application No. PCT/US2017/067994, filed Dec. 21, 2017, 13 pages.
Micali, "Efficient Certificate Revocation," Technical Report TM-542b, MIT Laboratory for Computer Science, Mar. 22, 1996, 10 pages.

* cited by examiner

PUBLIC KEY ROLLUP FOR MERKLE TREE SIGNATURE SCHEME

CROSS-REFERENCE TO RELATED APPLICATIONS

This application incorporates by reference for all purposes the full disclosures of co-pending U.S. patent application Ser. No. 15/390,176, filed concurrently herewith, entitled "SIGNATURE DELEGATION", co-pending U.S. patent application Ser. No. 15/390,205, filed concurrently herewith, entitled "KEY REVOCATION", of co-pending U.S. patent application Ser. No. 15/390,214, filed concurrently herewith, entitled "KEY DISTRIBUTION IN A DISTRIBUTED COMPUTING ENVIRONMENT", co-pending U.S. patent application Ser. No. 15/389,771, filed concurrently herewith, entitled "HOST ATTESTATION".

BACKGROUND

Protecting the integrity of digital signatures is an important problem. Many digital signatures rely on cryptographic keys that are controlled by a central authority. The central authority maintains control over the cryptographic keys which are used to generate digital signatures and perform other cryptographic operations. For many large businesses, a central authority operates as part of a distributed computing environment, and cryptographic operations are performed by a variety of computing entities on behalf of the central authority. In such environments, the various computing entities acting on behalf of the central authority may apply digital signatures using a cryptographic key associated with the central authority. Therefore, controlling the distribution of cryptographic keys from the central authority to the various computing entities that act on behalf of the central authority is an important problem.

BRIEF DESCRIPTION OF THE DRAWINGS

Various techniques will be described with reference to the drawings, in which.

DETAILED DESCRIPTION

Figure 1:
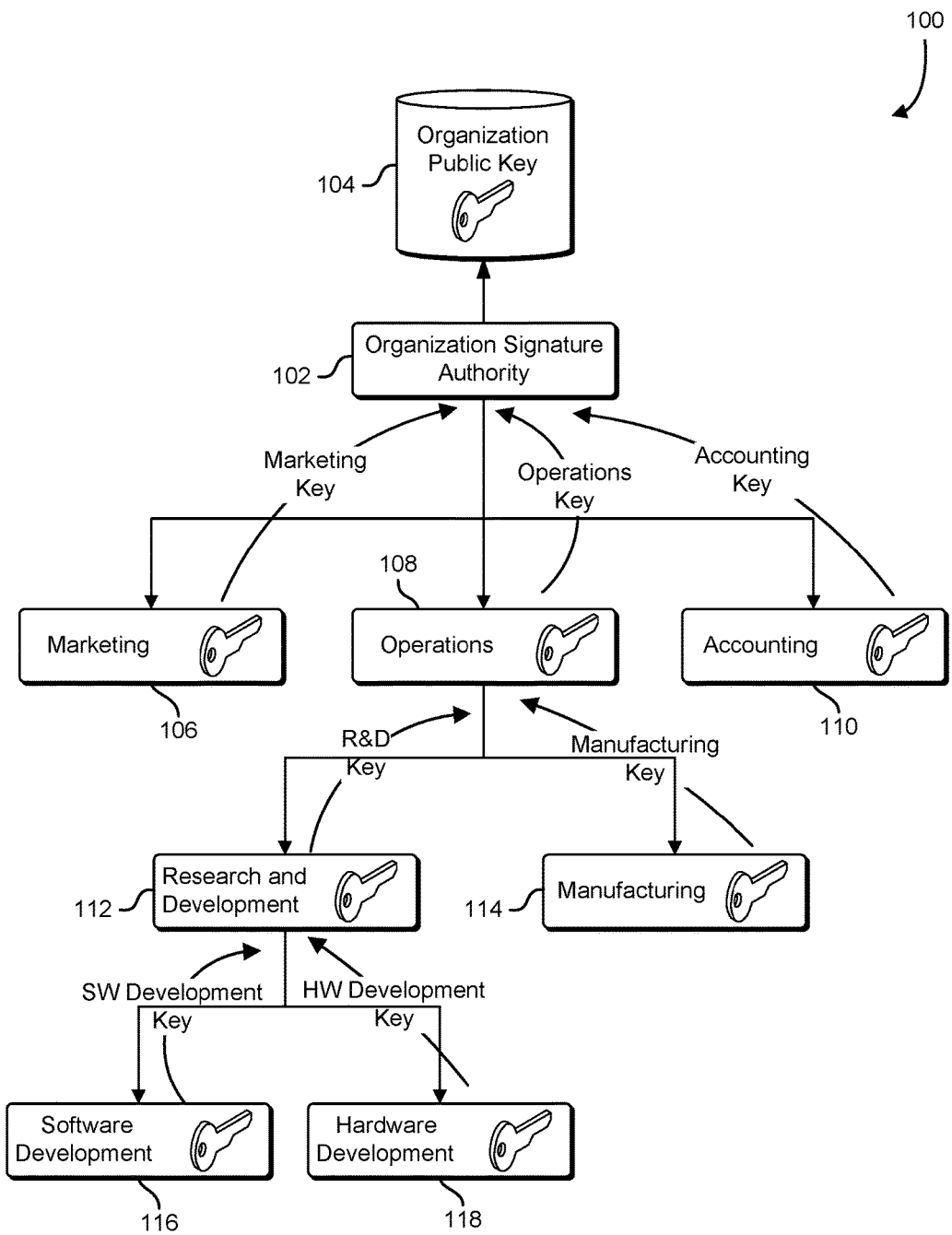
FIG. 1 shows an illustrative example of an environment in which various embodiments may be practiced.

The current document describes methods that delegate the signing authority of an organization to a variety of departments, groups, or other subordinate organizational units. The organization operates a service that functions as an organizational signature authority. Each subordinate organizational unit operates a signature delegate computer system. The signature delegate computer system generates a set of cryptographic keys to be used by the delegate. The cryptographic keys may be asymmetric cryptographic keys, symmetric cryptographic keys, or one-time-use cryptographic keys such as Lamport keys or Winternitz keys. The signature delegate computer system generates a hash that acts as a public key for the subordinate organizational unit by applying a cryptographic hash function to the set of cryptographic keys. In some examples, the hash is a root node of a Merkle tree, and the set of cryptographic keys is a set of one-time-use cryptographic keys that act as the leaf nodes for the Merkle tree. The signature delegate computer system provides the public key of the subordinate organizational unit (hash) to the organizational signature authority.

The organizational signature authority collects public keys from each subordinate organizational unit via a corresponding signature delegate computer system. The organizational signature authority generates a rollup of the hashes to an organizational root hash which acts as a public key for the organization. The rollup may be achieved in a number of different ways. In some implementations, the organizational signature authority generates an organizational hash tree of the public keys provided by each of the signature delegate computer systems, and the root of the organizational hash tree serves as a public key for the organization. In various implementations, the organizational signature authority provides selected internal nodes of the organizational hash tree to each signature delegate computer system so that digital signatures produced with cryptographic keys produced by the delegate computer systems can be verified against the public key of the organization. In some examples, the organizational signature authority publishes the organizational hash tree.

When a delegate computer system operated by a subordinate organizational unit generates a digital signature, the delegate computer system selects a cryptographic key from the set of cryptographic keys generated for the subordinate organizational unit. The selected cryptographic key is used to generate a digital signature, and in an implementation where the cryptographic key is a one-time-use cryptographic key, the delegate computer system records that the selected cryptographic key has been used. The digital signature is provided to a recipient. Additional information may be provided to the recipient that allows the recipient to verify the signature against the public key of the organization. The additional information may include intermediate hashes and public key information that allows the recipient to regenerate one or more public keys associated with subordinate organizational units. The additional information may include intermediate hashes in public key information that allows the recipient to regenerate the public key of the organization.

In some examples, the digital signature is generated with a one-time-use cryptographic key associated with a particular subordinate organizational unit. The delegate computer system provides portions of a subordinate hash tree that links public portions of the one-time-use cryptographic key to a public key of the subordinate organizational unit. The organizational signature authority provides portions of an organizational hash tree that links the public key of each subordinate organizational unit to the public key of the organization. By verifying the digital signature, the recipient is able to confirm that the digital signature was generated under the authority of the organization and identify the particular subordinate organizational units involved in producing the digital signature. In some examples, the entity that generates the digital signature includes an organizational hierarchy of the signer that can be confirmed by the recipient by verifying the signature against the public keys of the organizational units between the organizational signature authority and the signer.

In some examples, signature authority is distributed through a multi-level organizational structure where intermediate subordinate organizational units both generate cryptographic keys and roll up subordinate public keys to create a public key for the intermediate subordinate organizational unit. In one implementation, an intermediate subordinate organizational unit generates a set of one-time-use cryptographic keys, each key including a public part and private part. The public parts of the one-time-use cryptographic keys are arranged in a Merkle tree. The intermediate subordinate organizational unit maintains an organizational database that describes the structure of the organization. Using the organizational database, the intermediate subordinate organizational unit contacts each sub-subordinate organizational unit of the intermediate subordinate organizational unit to acquire a corresponding public key for each sub-subordinate organizational unit. The hash tree is generated using the public keys of the sub-subordinate organizational units, and the root of the hash tree and the root of the Merkle tree are combined to create a single hash that acts as a public key for the intermediate subordinate organizational unit. The public key of the intermediate subordinate organizational unit is provided to a superior organizational unit which may be the organizational signature authority or another intermediate subordinate organizational unit. In some implementations, the public keys of sub-subordinate organizational units and the public parts of the one-time-use cryptographic keys are combined in a single hash tree that produces a single root that acts as a public key for the subordinate intermediate organizational unit. In some examples, the organizational signature authority generates cryptographic keys for use by the organizational signature authority in addition to rolling out public keys from subordinate organizational units.

If the structure of the organization changes, parts of the hash trees associated with various organizational units may be regenerated. For example, if the new subordinate organizational unit is added, the new subordinate organizational unit may generate a set of cryptographic keys and a corresponding Merkle tree and public key. The public key of the new subordinate organizational unit is provided to the organizational signature authority, which adds the public key of the new subordinate organizational unit to the hash tree of the organization and re-computes the public key of the organization. In some implementations, the public key of the organization is regenerated periodically. In some examples, the public key is regenerated daily.

In some examples, superior organizational units may provide additional cryptographic keys to subordinate organizational units. In one example, a superior organizational unit generates a first set of one-time-use cryptographic keys that are integrated into a hash tree that produces a public key for the superior organizational unit. A subordinate organizational unit of the superior organizational unit generates a second set of one-time-use cryptographic keys. The subordinate organizational unit uses cryptographic keys from the second set of one-time-use cryptographic keys, and records the use of each key in a database. If the subordinate organizational unit runs out of cryptographic keys, the subordinate organizational unit submits a request to the superior organizational unit for additional one-time-use cryptographic keys. The superior organizational unit may issue additional one-time-use cryptographic keys to the subordinate organizational unit from the first set of one-time-use cryptographic keys.

In certain environments, it is desirable to distribute signature authority amongst a number of subordinate entities that operate under common organizational umbrella. For example, a business may determine that a marketing department, a sales department, an R&D department, and an accounting department be authorized to digitally sign documents on behalf of the business. To accomplish this, the business implements a signature authority computer system that performs that produces and publishes a public key for the business.

In order to produce the public key for the business, the subordinate departments each produce and associated public key. To do this, each department to be granted signature authority deploys a subordinate signature authority computer system. Each subordinate signature authority computer system generates a set of cryptographic keys for use by an associated department. Each subordinate signature authority computer system produces a public key which is cryptographically derived from the set of cryptographic keys. In some examples, the set of cryptographic keys is a set of one-time-use cryptographic keys arranged in a Merkle tree, and the root of the Merkle tree serves as the public key for the associated department.

After producing the public keys, each subordinate signature authority computer system provides its associated public key to the signature authority computer system for the business. The signature authority computer system for the business cryptographically derives a public key for the business from the public keys of the subordinate signature authority computer systems. In some examples, the public key for the business is cryptographically derived by generating a hash tree from the public keys provided by the subordinate signature authority computer systems. The hash tree is generated so that each interior node of the hash tree is generated by taking a cryptographic hash of a combination of its child nodes. The root node of the hash tree acts as the public key for the business.

When a subordinate entity uses its subordinate signature authority computer system to produce a digital signature, the resulting digital signature can be verified against both the public key of the subordinate business entity and the public key of the business entity itself. This allows a consumer of a digital signature to identify the producer of the signature and the ultimate chain of authority used to generate the digital signature. The business entity is able to decentralize and distribute the task of generating cryptographic signatures, thereby improving reliability and performance of cryptographic signing operations.

FIG. 1 shows an illustrative example of an environment in which various embodiments may be practiced. An organizational diagram 100 shows an organization signature authority 102 and related subordinate signature authorities. In various examples, the organizational diagram 100 may correspond to the organizational structure of a corporation, business, or other entity. The organizational signature authority is a computer system that implements a service which is responsible for managing cryptographic keys that are used under the authority of the organization. The cryptographic keys may be generated and controlled directly by the organization signature authority 102, by one or more subordinate organizational signature authorities, or by a combination thereof. The organization signature authority 102 produces, stores, and publishes an organization public key 104. The organization public key 104 is generated based on one or more public keys of subordinate organizational entities. In some implementations, the organization public key is generated by creating a hash tree from the public keys of the subordinate organizational entities. In other implementations, the organization public key is generated by hashing a list of public keys of the subordinate organizational entities.

The organization signature authority 102 may delegate signature authority to a number of subordinate signature authorities. Each subordinate signature authority is a service running on a computer system, computer server, server cluster or virtual computer system that generates and provides a public key associated with a corresponding subordinate organizational entity. In some examples, the public key is cryptographically derived from a set of cryptographic keys generated and used by the subordinate organizational entity. In other examples, the public key is cryptographically derived from one or more sub-subordinate signature authorities associated with the subordinate organizational entity. In yet another example, the public key is cryptographically derived from a combination of the set of cryptographic keys and public keys of one or more sub-subordinate signature authorities.

In the example shown in FIG. 1, the organization signature authority 102 delegates signing authority to a marketing subordinate signature authority 106, an operations subordinate signature authority 108, and an accounting subordinate signature authority 110. The marketing subordinate signature authority 106 and the accounting subordinate signature authority 110 generate cryptographic keys, and each of the subordinate signature authorities cryptographically derives a public key from the cryptographic keys generated by the subordinate signature authority. The operations subordinate signature authority 108 acts as an intermediate signature authority. The operations subordinate signature authority 108 collects public keys from a research and development signature authority 112 and a manufacturing subordinate signature authority 114. In some examples, the operations subordinate signature authority 108 also generates a set of cryptographic keys. The public keys of the research and development signature authority 112 and the manufacturing subordinate signature authority 114 are combined with public portions of cryptographic keys generated by the operations subordinate signature authority 108 to produce a public key for the operations subordinate signature authority 108. In some implementations, the cryptographic keys generated by the operations subordinate signature authority 108 are one-time-use cryptographic keys, and the one-time-use cryptographic keys are arranged in a hash tree. The root node of the hash tree is combined with the public keys of the research and development signature authority 112 in the manufacturing subordinate signature authority 114, and a cryptographic hash of the combination is determined. The cryptographic hash acts as a public key for the operations subordinate signature authority 108.

In the example shown in FIG. 1, the research and development signature authority 112 acts as an intermediate subordinate signature authority. The research and development signature authority 112 receives public keys from a software development signature authority 116 and a hardware development signature authority 118. The research and development signature authority 112 uses the public keys and, optionally, a set of cryptographic keys generated by the research and development signature authority 112, to generate a public key for the research and development signature authority 112.

An entity may request a digital signature from any of the signature authorities associated with the organization signature authority 102. If, for example an entity requests a digital signature from the manufacturing subordinate signature authority 114, the manufacturing subordinate signature authority 114 uses a cryptographic key generated by the manufacturing subordinate signature authority 114 to generate a digital signature, and provides the digital signature to the requesting entity. If the entity requests a digital signature from the marketing subordinate signature authority 106, the marketing subordinate signature authority 106 selects a cryptographic key from a set of one-time-use cryptographic keys generated by the marketing subordinate signature authority 106 to be used in generating a digital signature for the requester. In addition to the digital signature, the entity may receive a number of public keys and intermediate hashes that allow the entity to confirm the digital signature against the public key of the subordinate authority that provided the key and public keys of superior signature authorities above the subordinate authority. For example, a digital signature provided by the manufacturing subordinate signature authority 114 may include intermediate hashes and a public key for the manufacturing subordinate signature authority 114, the operations subordinate signature authority 108, and the organization signature authority 102. In some implementations, the public keys of the signature authorities may be provided in a digital certificate signed by a trusted certificate authority.

If the structure of the organization changes, corresponding changes to the signature authority structure may be implemented by regenerating hash trees and public keys associated with the remaining signature authorities in the organization. If the new signature authority is added to the organization, the new signature authority generates cryptographic keys, acquires public keys from subordinate signature authorities, and generates a public key for the new signature authority. The new public key is provided to a superior signature authority which then regenerates its hash trees and public key. The new public key of the superior signature authority is provided to another superior signature authority or the organization signature authority until the organization public key is regenerated.

Figure 2:
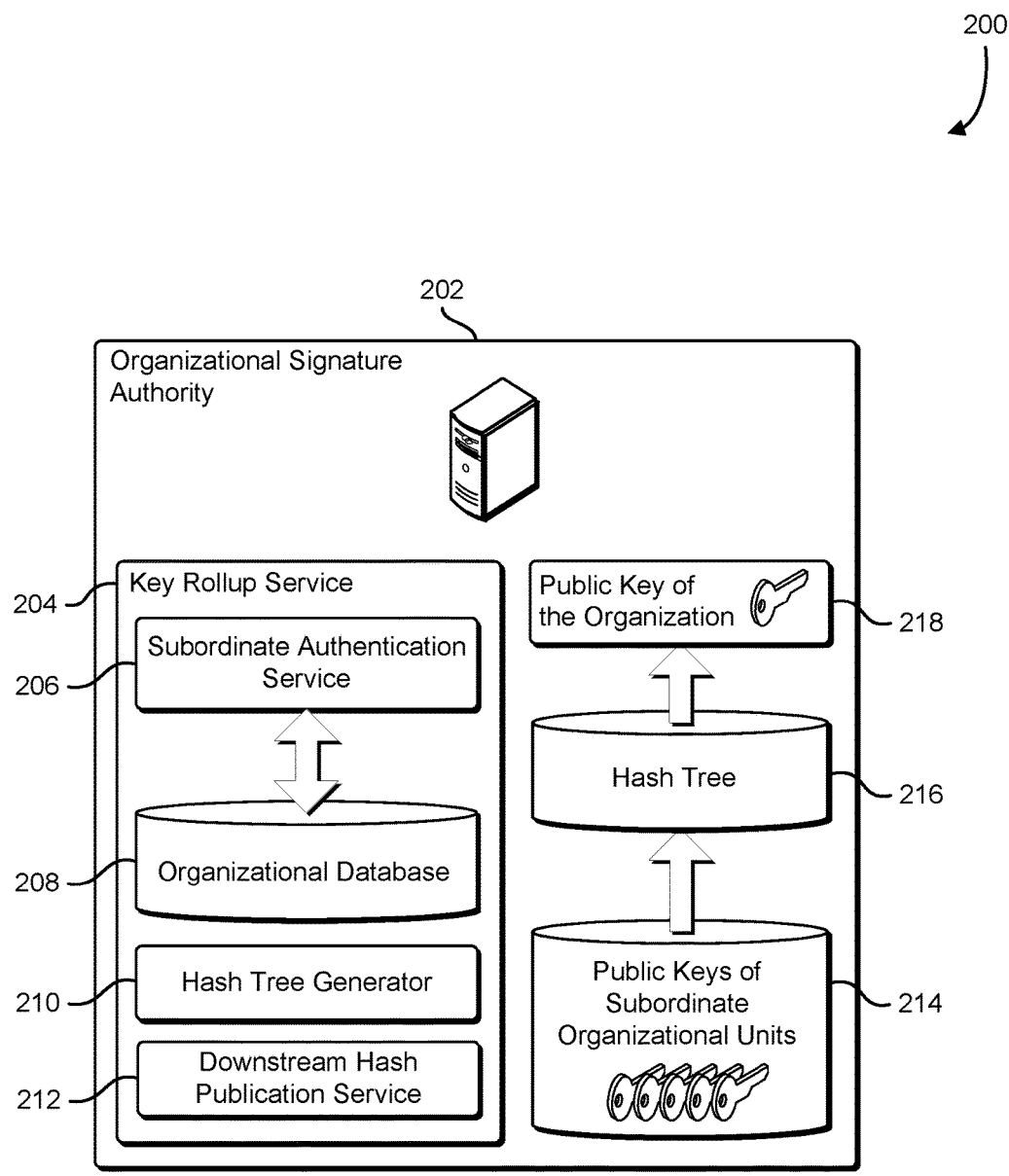
FIG. 2 shows an illustrative example of an organizational signature authority computer system that produces an organizational public key from public keys acquired from a number of subordinate organizations.

FIG. 2 shows an illustrative example of an organizational signature authority computer system that produces an organizational public key from public keys acquired from a number of subordinate organizations. A block diagram 200 shows a structure for implementing an organizational signature authority 202. The organizational signature authority 202 is a computer system, server computer, server cluster, or virtual computer system. The organizational signature authority 202 includes a processor and a memory containing instructions that, when executed, implement a service that collects public keys from one or more subordinate signature authorities and generates a public key for an organization.

The organizational signature authority 202 includes a key rollup service 204. The key rollup service 204 includes a subordinate authentication service 206, an organizational database 208, a hash tree generator 210, and a downstream hash publication service 212. When a subordinate signature authority contacts the key rollup service 204 and provides a public key for the subordinate signature authority, the subordinate authentication service 206 verifies the identity of the subordinate authority. The subordinate authentication service 206 may verify the identity of the subordinate authority using a digital signature, a digital certificate, password, or other credential. If the subordinate authentication service determines that the identity of the subordinate signature authority is authentic, the subordinate authentication service 206 records the public key of the subordinate signature authority in a public key database 214. The public key database 214 is a relational database or in-memory data structure that retains public keys associated with subordinate organizational units. The subordinate authentication service 206 records information describing the subordinate signature authority in the organizational database 208. In various implementations, the organizational database 208 records the structure of the organization and information relating to subordinate signature authorities.

The hash tree generator 210 retrieves the public keys from the public key database 214 and generates a hash tree 216. The hash tree uses the public keys as leaf nodes of the hash tree 216. In various implementations, the hash tree 216 maybe a binary, or n-ary tree structure where parent nodes have a value that is cryptographically derived from a combination of each parent node's children. In some examples, the value of the parent node may be cryptographically derived using a cryptographic hash function. The root node of the hash tree 216 is used to generate a public key 218 for the organization. In some examples, the value of the root node is the public key 218. In other examples, the value of the root node is used to derive the public key 218.

In response to providing the organizational signature authority 202 with a public key, the downstream hash publication service 212 provides the subordinate signature authorities with the public key 218 and one or more hash values from the hash tree 216. The public key 218 and the one or more hash values from the hash tree 216 are selected to enable each subordinate signature authority to verify cryptographic signatures generated with keys generated by the subordinate signature authority. In some implementations, the downstream hash publication service 212 provides the hash tree 216, the public key 218, and the public keys stored in the public key database 214 to the subordinate signature authorities. In other implementations, the downstream hash publication service identifies those hashes used to re-create the public key 218 from the public key of a particular subordinate, and provides only those hashes to the particular subordinate. In some examples, the downstream hash publication service 212 provides the hashes to the subordinate signature authorities in response to each signature authority submitting a public key. In other examples, the downstream hash publication service 212 publishes the hashes via a service that may be accessed independently.

Figure 3:
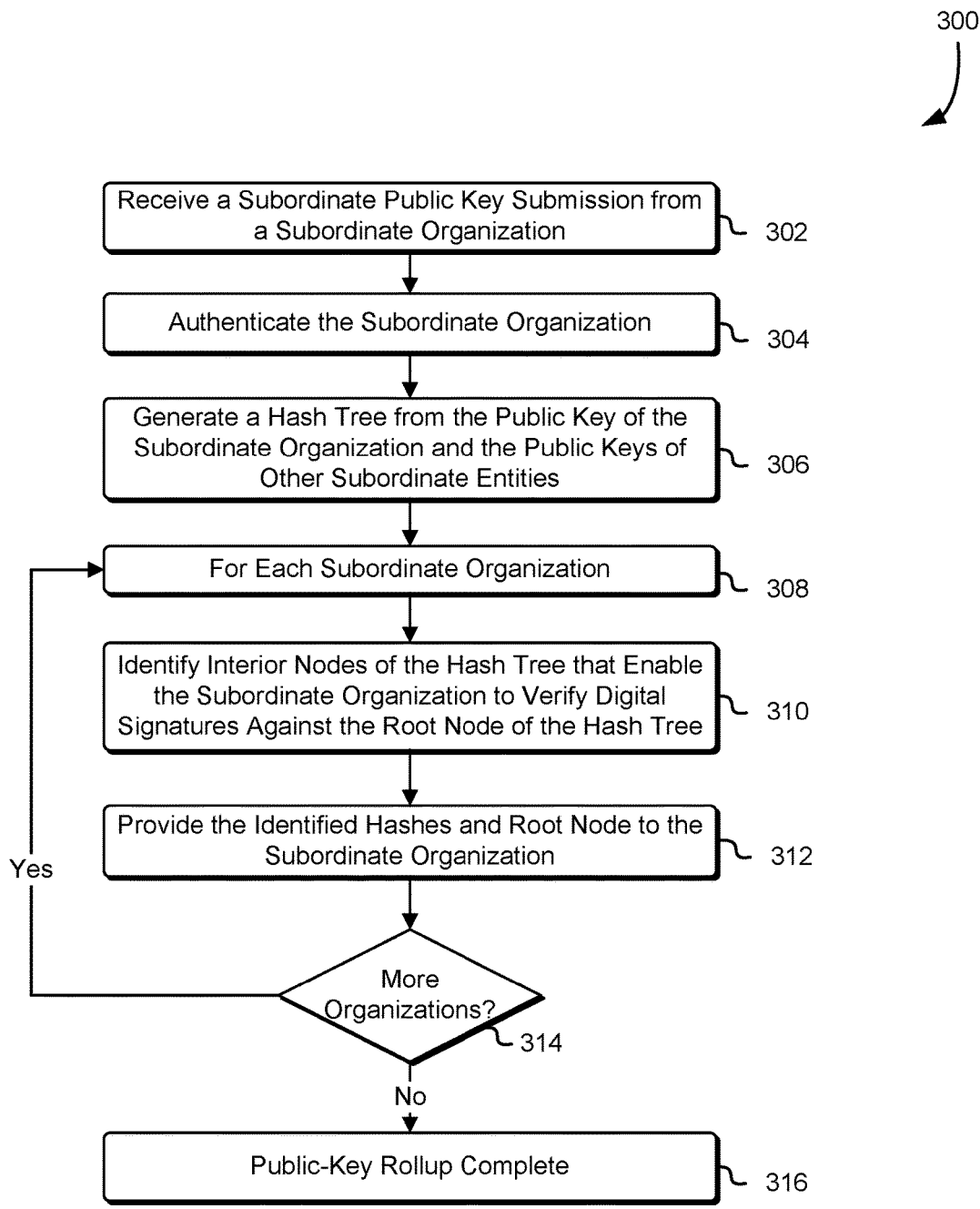
FIG. 3 shows an illustrative example of a process that, as a result of being performed by an organizational signature authority computer system, produces an organizational public key from a number of public keys associated with subordinate organizations.

FIG. 3 shows an illustrative example of a process that, as a result of being performed by an organizational signature authority computer system, produces an organizational public key from a number of public keys associated with subordinate organizations. A flowchart 300 illustrates a process that begins at block 302 with an organizational security authority receiving a public key from a subordinate signature authority operated by a subordinate organization. In some implementations, the public key of the subordinate signature authority is a hash value of cryptographic keys generated by the subordinate signature authority. In other implementations, the public key of the signature authority is a hash value of a combination of other public keys of other subordinate organizations. In yet other implementations, the public key is a cryptographically derived hash of a combination of cryptographic keys and public keys of other subordinate organizations. At block 304, the organizational signature authority authenticates the identity of the provider of the public key to confirm that the public key is the authentic public key of the subordinate organization. In some examples, the identity of the provider of the public key is validated against an organizational database maintained by the organizational signature authority. If the source of the public key cannot be authenticated, the process ends and the public key is not processed by the organizational signature authority.

At block 306, the organizational signature authority generates a public key for the organization based at least in part on the public key of the subordinate signature authority. In some examples, the organizational signature authority retrieves public keys for a collection of subordinate signature authorities that includes the subordinate signature authority, and arranges the collection of public keys into a hash tree where each interior node of the hash tree is cryptographically derived using a cryptographic hash function from a combination of the interior node's child nodes. The root of the hash tree is used as the public key of the organizational signature authority. The organizational signature authority stores information describing each subordinate organization in an organizational database.

At block 308, the organizational signature authority initiates a loop that iterates over each subordinate signature authority from which the organizational signature authority received an authentic public key. At block 310, the organizational signature authority identifies a set of hashes from the hash tree that allow the iterated subordinate signature authority to verify digital signatures generated with the subordinate signature authority's cryptographic keys. In some implementations, the set of hashes is determined by identifying nodes between the public key of the subordinate signature authority and the public key of the organization and adding those nodes that are children of the identified nodes. At block 312, the organizational signature authority provides the identified hashes and the public key of the organization to the iterated subordinate organization. In some implementations, the organizational signature authority provides the entire hash tree and the public key of the organization to the iterated subordinate organization. At block 314, the organizational signature authority determines whether there are more subordinate organizations of the organization. If there are more subordinate organizations of the organization, execution returns to block 308 and the next subordinate organization is processed.

If there are not more subordinate organizations of the organization, execution advances to block 316. At block 316, the rollup of the subordinate public keys is complete and the public key of the organization is generated.

Figure 4:
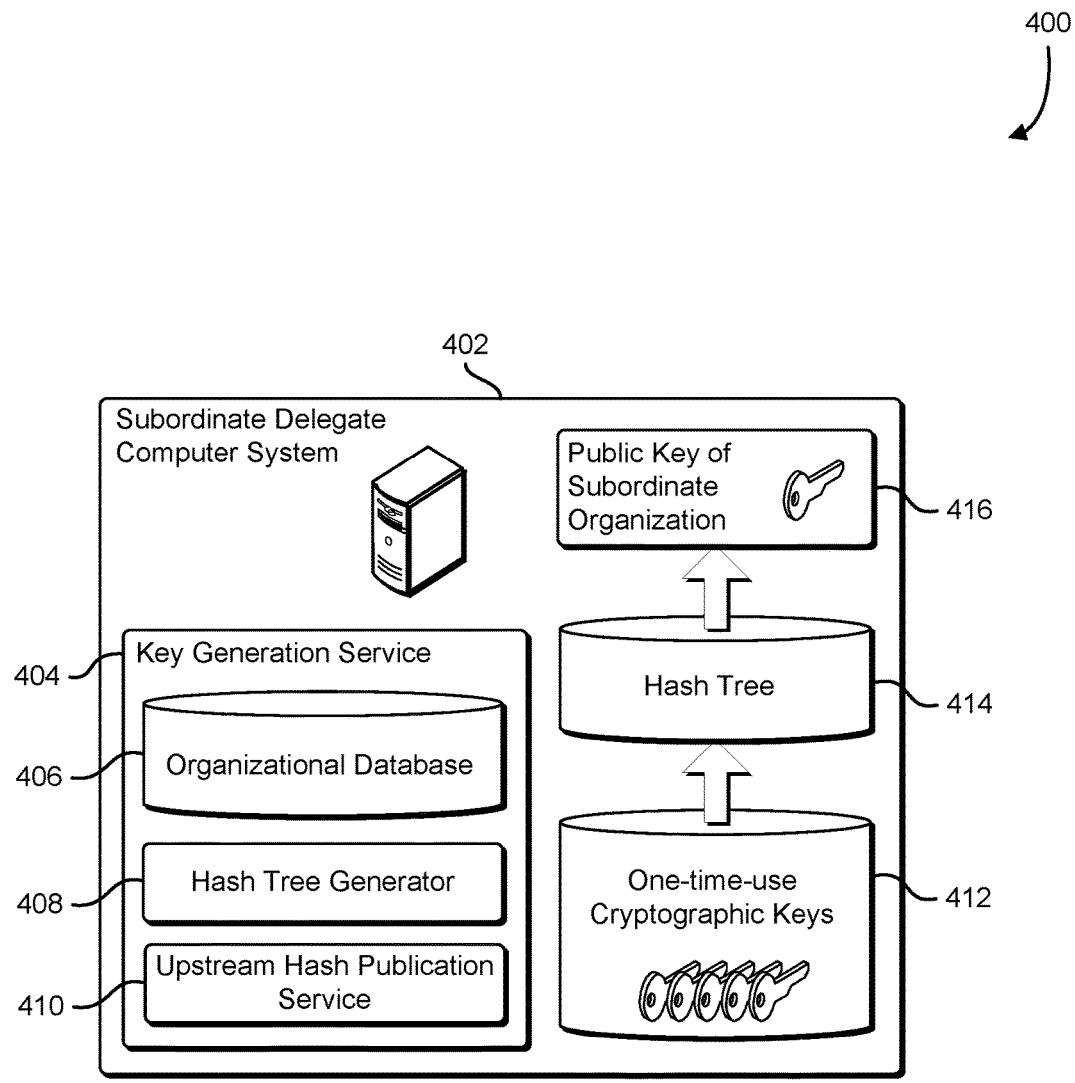
FIG. 4 shows an illustrative example of a subordinate delegate computer system that produces a subordinate public key from a set of one-time-use cryptographic keys generated by the subordinate delegate computer system.

FIG. 4 shows an illustrative example of a subordinate delegate computer system that produces a subordinate public key from a set of one-time-use cryptographic keys generated by the subordinate delegate computer system. A block diagram 400 shows a structure of a subordinate delegate computer system 402. The subordinate delegate computer system is a computer system, computer server, server cluster or virtual computer system that includes a processor and memory. The memory includes instructions that, when executed, implement one or more services. The subordinate delegate computer system 402 includes a key generation service 404. The key generation service 404 generates cryptographic keys for use by the subordinate delegate computer system 402. The key generation service 404 maintains an organizational database 406. The organizational database 406 is a relational database or in-memory data structure that retains information describing the organization. The organizational database 406 retains information that identifies the superior signature authority and any subordinate signature authorities of the subordinate delegate computer system 402. The key generation service 404 includes a hash tree generator 408 and an upstream hash publication service 410.

The key generation service 404 generates a set of one-time-use cryptographic keys that are stored in a key database 412. In some implementations the set of one-time-use cryptographic keys is comprised of Lamport keys or Winternitz keys. The hash tree generator 408 produces a hash tree 414 from the set of one-time-use cryptographic keys in the key database 412. In some implementations, the hash tree generator 408 generates the hash tree 414 by hashing a public portion of the set of one-time-use cryptographic keys, and generating the hash tree 414 from the resulting hashes. The hash tree 414 may be a binary tree, trinary tree, or n-ary tree. In some implementations the hash tree has one level and a fanout of n, where n is the number of one-time-use cryptographic keys generated by the key generation service 404. The root of the hash tree 414 acts as a public key 416 of the subordinate delegate computer system 402.

The upstream hash publication service 410 publishes information to a superior signature authority that links the cryptographic keys generated by the key generation service 404 to a public key associated with the superior signature authority and, eventually, to the public key of the organization. In some examples, the information is the public key 416. In other examples, the information includes information that describes the subordinate organization such as the name of the subordinate organization and the location of the subordinate organization within the overall organizational structure.

Figure 5:
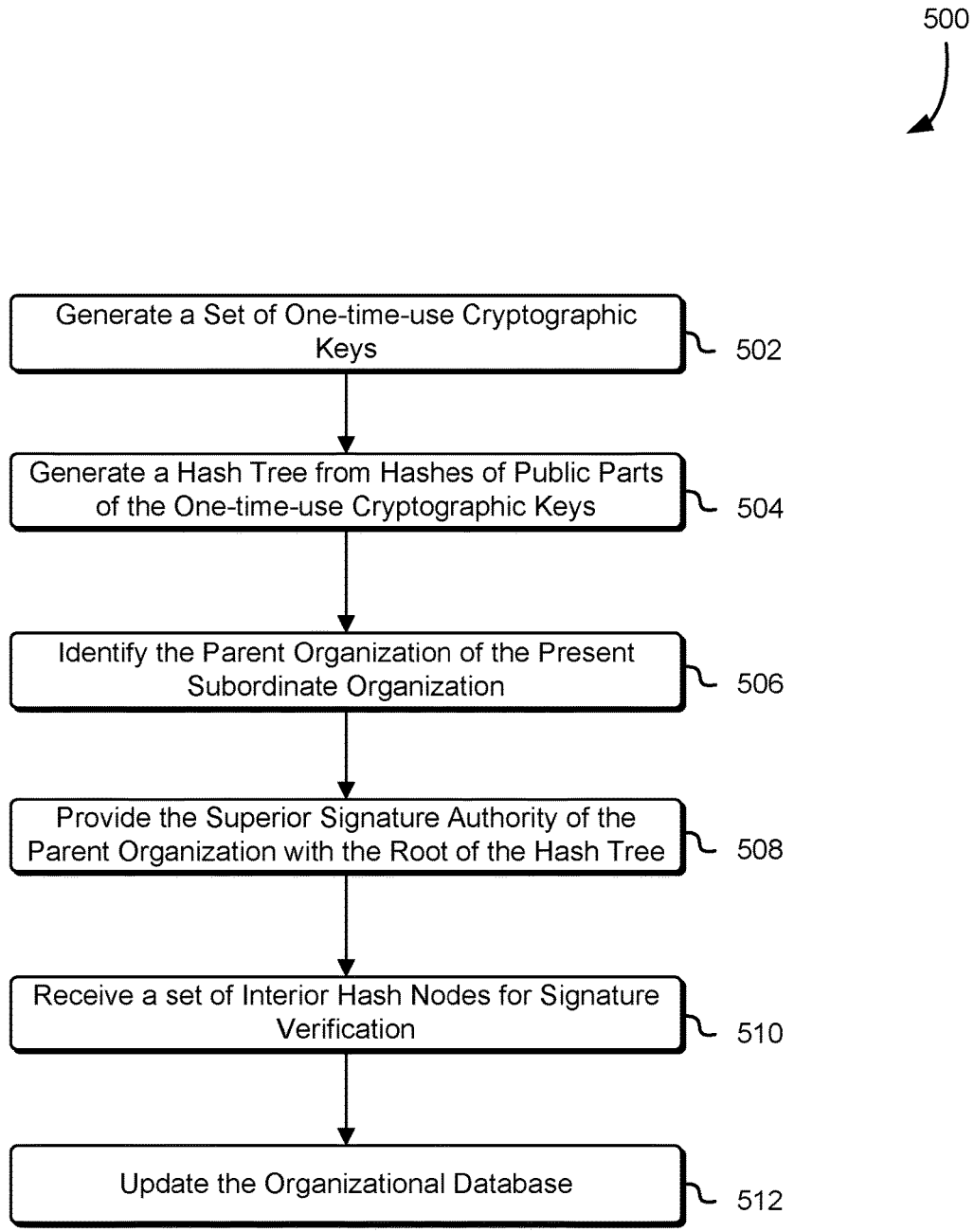
FIG. 5 shows an illustrative example of a process that, as a result of being performed by a subordinate delegate computer system, generates a public key for the subordinate delegate computer system based on a set of one-time-use cryptographic keys generated by the subordinate delegate computer system.

FIG. 5 shows an illustrative example of a process that, as a result of being performed by a subordinate delegate computer system, generates a public key for the subordinate delegate computer system based on a set of one-time-use cryptographic keys generated by the subordinate delegate computer system. A flowchart 500 illustrates a process that begins at block 502 with a subordinate delegate computer system generating a set of one-time-use cryptographic keys. Each of the one-time-use cryptographic keys includes a private part and the public part. In some implementations, the one-time-use keys are Lamport keys or Winternitz keys. At block 504, the subordinate delegate computer system hashes the public parts of the one-time-use cryptographic keys to produce a set of hashes. The set of hashes is used to generate leaf nodes for the hash tree. Each interior node of the hash tree is generated by taking a cryptographic hash of the values of the child nodes of each interior node. The root of the hash tree serves as a public key for the subordinate delegate computer system. At block 506, the subordinate delegate computer system identifies a superior signature authority for the subordinate delegate computer system. In some implementations, the superior signature authority is identified from an organizational database maintained by the subordinate delegate computer system. At block 508, the subordinate delegate computer system provides the identified superior signature authority with the public key of the subordinate delegate computer system. The subordinate delegate computer system provides an authentication credential to the identified superior signature authority. In various examples, the authentication credential is a digital certificate signed by a trusted certificate authority, a password, a digital signature, or other credential.

At block 510, after having provided the superior signature authority with the public key of the subordinate delegate computer system, the subordinate delegate computer system receives a set of verification information from the superior signature authority. The verification information includes public keys and intermediate hash values of the superior signature authority and other superior signature authorities. The verification information enables the subordinate delegate computer system to verify digital signatures generated with one-time-use cryptographic keys generated by the subordinate delegate computer system. At block 512, the subordinate delegate computer system updates the organizational database with the public key information and verification information provided by the superior signature authority.

Figure 6:
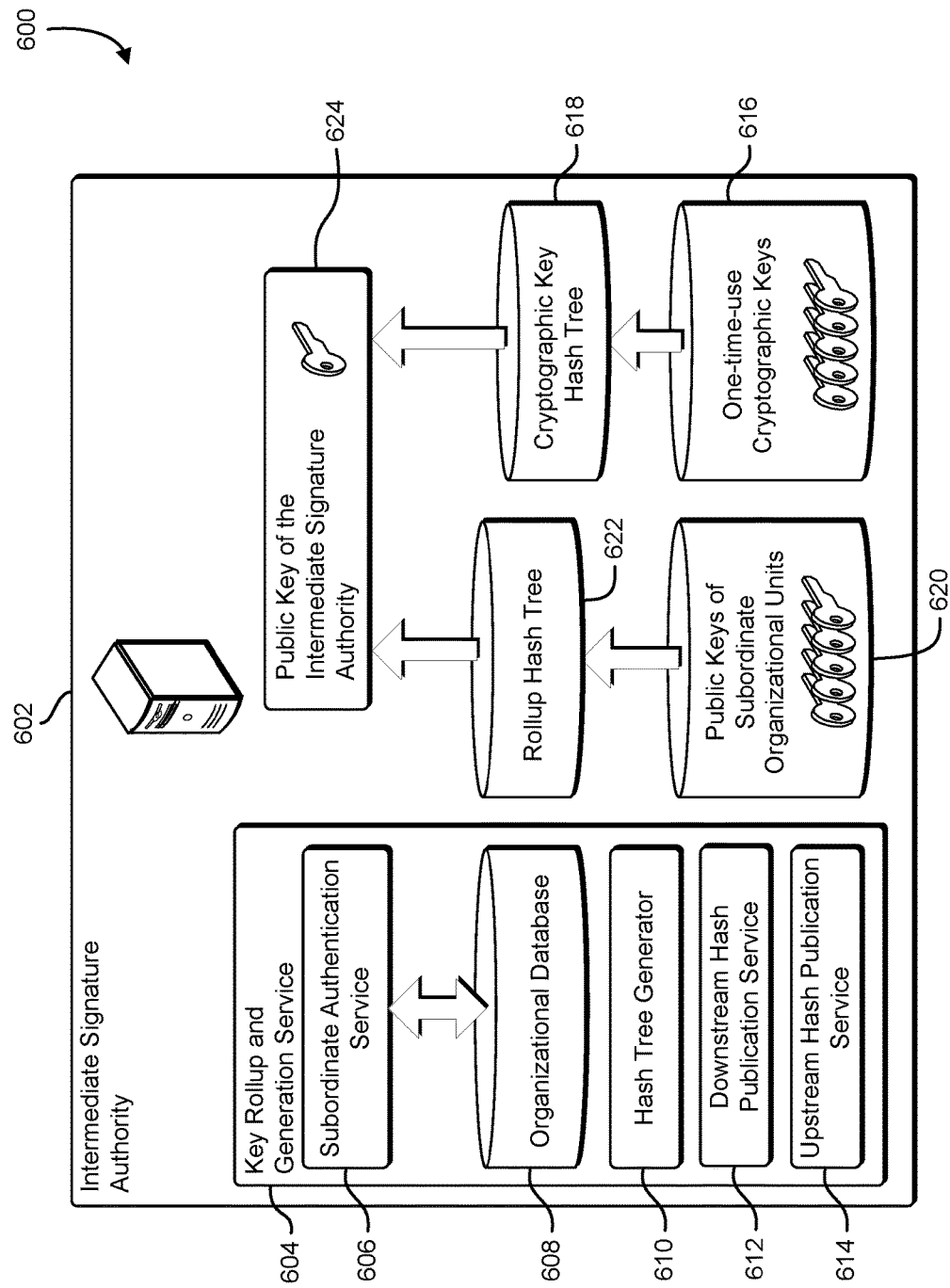
FIG. 6 shows an illustrative example of an intermediate signature authority computer system that produces a subordinate public key from a combination of a set of one-time-use cryptographic keys generated by the subordinate delegate computer system and a set of sub-subordinate public keys provided to the intermediate signature authority.

FIG. 6 shows an illustrative example of an intermediate signature authority computer system that produces a subordinate public key from a combination of a set of one-time-use cryptographic keys generated by the subordinate delegate computer system and a set of sub-subordinate public keys provided to the intermediate signature authority. A block diagram 600 shows an intermediate signature authority 602. The intermediate signature authority is a signature authority computer system operated by an intermediate organizational unit of an organization. The intermediate organizational unit is part of an organizational structure that includes both subordinates of the intermediate organizational unit and superiors of the intermediate organizational unit. In the implementation shown in FIG. 6, the intermediate signature authority 602 generates a set of one-time-use cryptographic keys for use by the intermediate signature authority 602 and rolls up subordinate public keys of subordinate organizational units into a public key for the intermediate signature authority. The intermediate signature authority provides the public key to its superior signature authority which is operated by its superior organizational unit. The operations subordinate signature authority 108 in FIG. 1 is an example of an intermediate organizational unit.

The intermediate signature authority 602 includes a key rollup and generation service 604. The key rollup and generation service includes a subordinate authentication service 606, an organizational database 608, a hash tree generator 610, a downstream hash publication service 612, and an upstream hash publication service 614. The key rollup and generation service 604 generates a set of one-time-use cryptographic keys and stores the keys in a key database 616. The one-time-use cryptographic keys include both private parts and public parts. Public parts are cryptographically derived from the private parts using a cryptographic hash function. The private parts of the one-time-use cryptographic keys may be generated randomly using a hardware random number generator or a pseudorandom number generation technique. In some examples, the private parts of the one-time-use cryptographic keys are generated from a random seed value using a deterministic key derivation algorithm. In some implementations, the one-time-use cryptographic keys are Lamport keys or Winternitz keys. The hash tree generator 610 generates a cryptographic key hash tree 618 by hashing the public parts of the one-time-use cryptographic keys and using the resulting hashes to generate a hash tree.

One or more subordinate signature authorities operated by subordinate organizations contact the key rollup and generation service 604. Each subordinate signature authority supplies the public key for an associated subordinate organization. The organizational database 608 contains information that allows the key rollup and generation service 604 to identify and authenticate subordinate organizations. The subordinate authentication service 606 authenticates each subordinate signature authority using a digital certificate, digital signature, password, or other credential. In some implementations, the subordinate signature authority signs the provided public key with a secret key of a public-private key pair, and the public key of the public-private key pair is provided in a digital certificate which is signed by a trusted certificate authority. The public keys associated with the subordinate signature authorities that are authenticated by the intermediate signature authority 602 are stored in a public key database 620. The hash tree generator 610 generates a rollup hash tree 622 from the public keys. The root node of the rollup hash tree 622 and the cryptographic key hash tree 618 are combined and hashed with a cryptographic hash function to produce a public key of the intermediate signature authority 624.

The upstream hash publication service 614 provides the public key of the intermediate signature authority 624 to the superior signature authority operated by the superior organizational unit. In response, the superior signature authority provides the intermediate signature authority 602 with intermediate hashes and verification information. The intermediate hashes and verification information enables the intermediate signature authority 602 to verify digital signatures produced with the one-time-use cryptographic keys generated by the intermediate signature authority 602. In some implementations, the intermediate signature authority 602 publishes the intermediate hashes and verification information to other entities with digital signatures produced by the intermediate signature authority 602.

The downstream hash publication service 612 provides the intermediate hashes and verification information provided by the superior signature authority to subordinate signature authorities. In addition, the downstream hash publication service 612 provides the public key of the intermediate signature authority 624 and the rollup hash tree 622 to subordinate signature authorities. Information provided by the downstream hash publication service 612 allows subordinate signature authorities to verify digital signatures produced by the subordinate signature authority against the public key of the intermediate signature authority 624 and the public keys of superior signature authorities.

Figure 7:
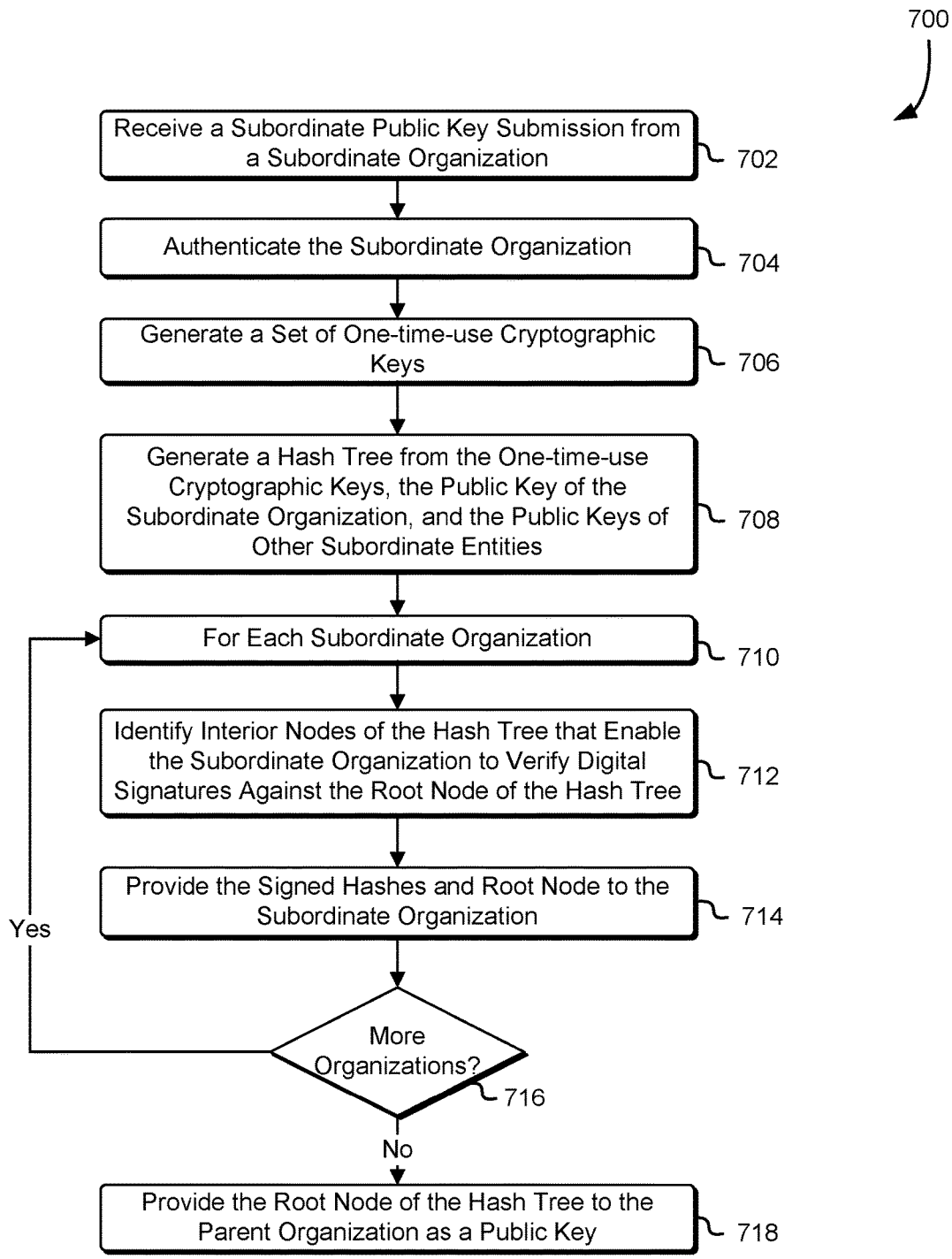
FIG. 7 shows an illustrative example of a process that, as a result of being performed by an intermediate signature authority computer system, generates a public key from a combination of a set of one-time-use cryptographic keys generated by the intermediate signature authority and a set of sub-subordinate public keys provided to the intermediate signature authority.

FIG. 7 shows an illustrative example of a process that, as a result of being performed by an intermediate signature authority computer system, generates a public key from a combination of a set of one-time-use cryptographic keys generated by the intermediate signature authority and a set of sub-subordinate public keys provided to the intermediate signature authority. A flowchart 700 illustrates a process that begins at block 702 with an intermediate signature authority receiving a public key from a subordinate signature authority operated by a subordinate organization. In some implementations, the public key of the subordinate signature authority is a hash value of cryptographic keys generated by the subordinate signature authority. In other implementations, the public key of the signature authority is a hash value of a combination of other public keys of other subordinate organizations. In yet other implementations, the public key is a cryptographically derived hash of a combination of cryptographic keys and public keys of other subordinate organizations. At block 704, the intermediate signature authority authenticates the identity of the provider of the public key to confirm that the public key is the authentic public key of the subordinate organization. In some examples, the identity of the provider of the public key is validated against an organizational database maintained by the intermediate signature authority. If the source of the public key cannot be authenticated, the process ends and the public key is not processed by the organizational signature authority. In some examples, a plurality of public keys associated with a plurality of subordinate organizational units are provided by a plurality of subordinate signature authorities.

At block 706, the intermediate signature authority generates a set of one-time-use cryptographic keys. Each of the one-time-use cryptographic keys includes a private part and the public part. In some implementations, the one-time-use keys are Lamport keys or Winternitz keys. At block 708, the intermediate signature authority generates a hash tree that combines the public keys provided by authenticated subordinate signature authorities with a set of hashes based on the set of one-time-use cryptographic keys. In some implementations, the intermediate signature authority generates a first hash tree from hashes of the public portions of the one-time-use cryptographic keys, and a second hash tree from the public keys provided by the authenticated subordinate signature authorities. The root node of the first hash tree and the root node of the second hash tree are combined and hashed to produce a public key for the intermediate signature authority.

At block 710, the intermediate signature authority initiates a loop that iterates over each subordinate signature authority from which the intermediate signature authority received an authentic public key. At block 712, the organizational signature authority identifies a set of hashes from the hash tree that enable the iterated subordinate signature authority to verify digital signatures generated with the subordinate signature authority's cryptographic keys. In some implementations, the set of hashes is determined by identifying nodes between the public key of the subordinate signature authority and the public key of the intermediate signature authority, and adding those nodes that are children of the identified nodes. At block 714, the intermediate signature authority provides the identified hashes and the public key of the organization to the iterated subordinate organization. In some implementations, the organizational signature authority provides the entire hash tree and the public key of the intermediate signature authority to the iterated subordinate organization. At decision block 716, the intermediate signature authority determines whether there are more subordinate organizations of the intermediate signature authority. If there are more subordinate organizations of the intermediate signature authority, execution returns to block 710 and the next subordinate signature authority is processed.

If there are no more subordinate organizations of the intermediate signature authority, execution advances to block 718. At block 718, the public key of the intermediate signature authority is provided to a superior signature authority of the intermediate signature authority. In some examples, in response to providing the public key of the intermediate signature authority to the superior signature authority, the superior signature authority may provide the intermediate signature authority with a set of hashes and public keys that allow the intermediate signature authority to verify digital signatures produced with the set of one-time-use cryptographic keys against a public key of the superior signature authority. The information provided by the superior signature authority may be provided to the subordinate signature authorities to enable the subordinate signature authorities to verify digital signatures against the public key of the superior signature authority.

Figure 8:
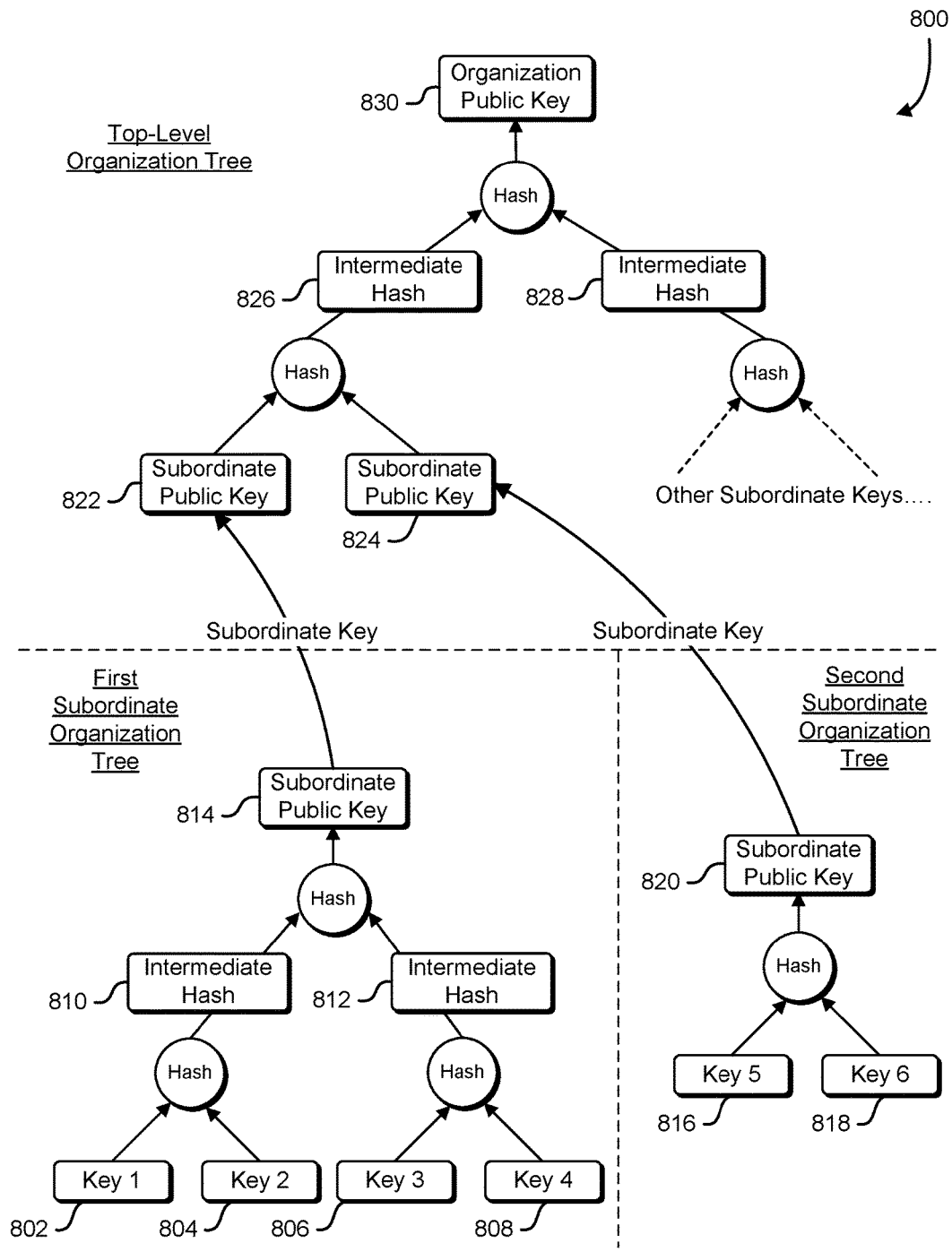
FIG. 8 shows an illustrative example of a rollup hash tree that combines cryptographic-key-based hash trees from a number of subordinate organizations to form an organization hash tree with an organization public key.

FIG. 8 shows an illustrative example of a rollup hash tree that combines cryptographic-key-based hash trees from a number of subordinate organizations to form an organization hash tree with an organization public key. A diagram 800 shows a first subordinate organization tree maintained by the first subordinate signature authority and a second subordinate organization tree maintained by a second subordinate signature authority.

The first subordinate organization tree is a hash tree generated from four cryptographic keys, a first cryptographic key 802, a second cryptographic key 804, a third cryptographic key 806, and a fourth cryptographic key 808. The cryptographic keys may be asymmetric cryptographic key pairs, or one-time-use cryptographic keys having public parts and private parts. The public parts of the cryptographic keys are used to cryptographically derive a pair of intermediate hashes. In some implementations, the intermediate hashes are derived from the cryptographic keys using a cryptographic hash function. The pair of intermediate hashes includes a first intermediate hash 810 and a second intermediate hash 812. The intermediate hashes are combined and a subordinate public key 814 is cryptographically derived from the intermediate hashes. The second subordinate organization tree is a hash tree generated from two cryptographic keys, the fifth cryptographic key 816, and a sixth cryptographic key 818. Public parts of the cryptographic keys are used to cryptographically derive a subordinate public key 820 for the second subordinate signature authority.

The first subordinate signature authority and the second subordinate signature authority each contact an organizational level signature authority and submit their respective public keys 814 and 820. The organizational signature authority authenticates the subordinate signature authorities and uses the subordinate public keys to complete a top-level organization hash tree. A copy of the first subordinate public key 822 and a copy of the second subordinate public key 824 are combined and hashed to generate a first intermediate hash 826. Other subordinate public keys are combined and hashed to produce a second intermediate hash 828. The first intermediate hash 826 and the second intermediate hash 828 are combined and hashed to produce an organization public key 830. In some implementations, the elements are combined by concatenating one or more elements. In other implementations, the elements are combined by applying an exclusive OR operation to the elements. In yet another implementation, the elements are combined by encrypting one element using another element as a key. Hashes may be produced using a cryptographic hash function or other one-way function.

When a digital signature is produced by a subordinate signature authority using a key maintained by the subordinate signature authority, the resulting digital signature can be verified against the public key of the subordinate signature authority and the organization public key 830. For example, if a digital signature is produced with the first cryptographic key 802, an entity may confirm that the digital signature is produced under the authority of the first subordinate signature authority and the organizational signature authority by re-creating the subordinate public key 814 and the organization public key 830. Using the public information associated with the first cryptographic key 802, the entity confirms that the digital signature was made with the first cryptographic key 802. Using the public information associated with the first cryptographic key 802 and the second cryptographic key 804, the entity is able to re-create the first intermediate hash 810. Using the re-created first intermediate hash and the second intermediate hash 812, the entity is able to re-create and confirm the subordinate public key 814. The intermediate hashes and public information used to re-create the subordinate public key 814 are provided by the first subordinate signature authority.

The organizational signature authority provides additional information that allows the digital signature to be confirmed against the organization public key 830. The entity is provided with the second subordinate public key 824 and using the confirmed subordinate public key 814, regenerates and confirms the first intermediate hash 826. The organizational signature authority provides the second intermediate hash 828 to the entity, and the entity combines the second intermediate hash 828 with the first intermediate hash 826 to re-create and confirm the organization public key 830.

Figure 9:
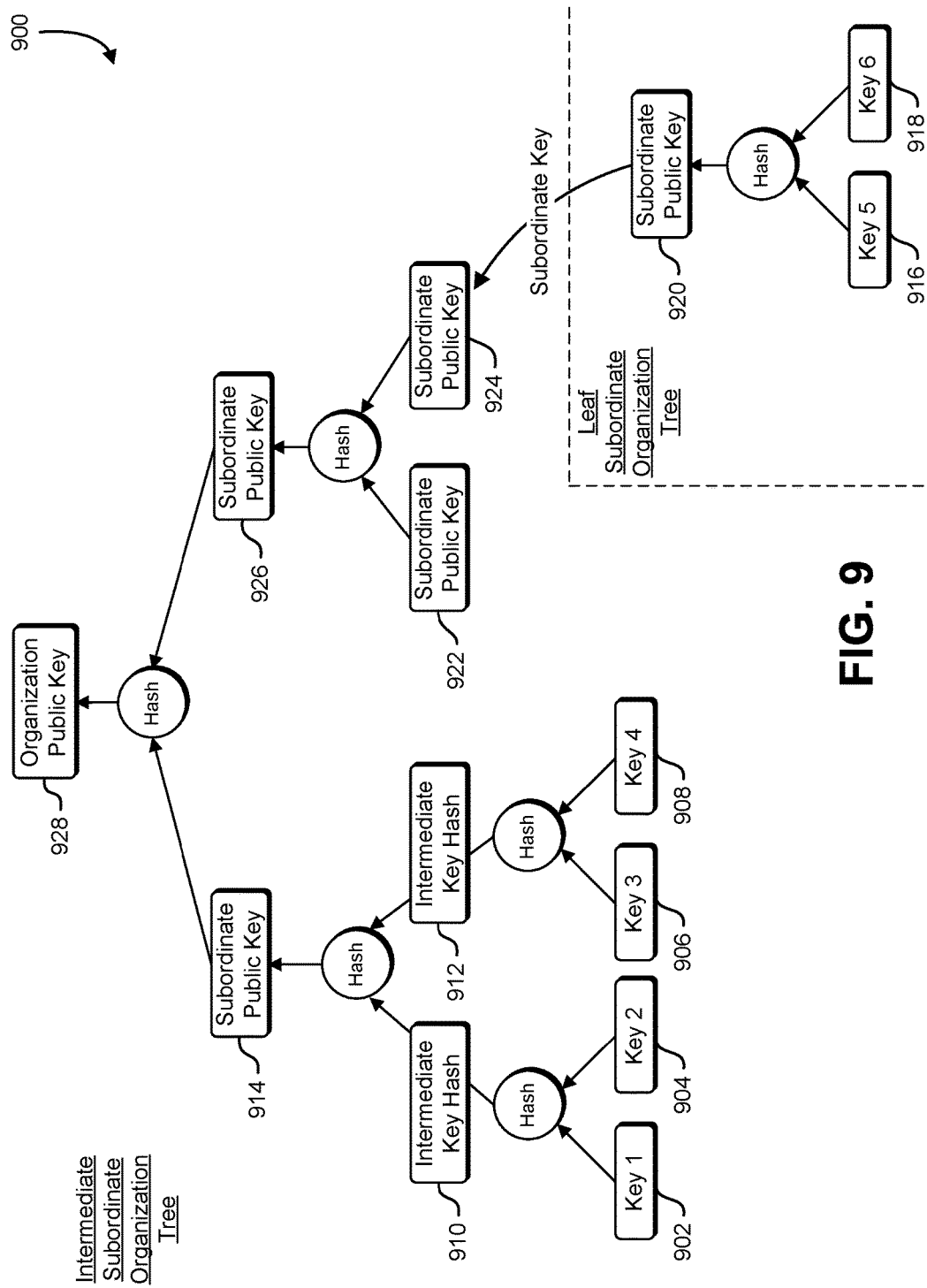
FIG. 9 shows an illustrative example of a portion of a rollup hash tree that combines a cryptographic-key-based hash tree and a subordinate hash tree to produce a public key of an intermediate subordinate entity.

FIG. 9 shows an illustrative example of a portion of a rollup hash tree that combines a cryptographic-key-based hash tree and a subordinate hash tree to produce a public key of an intermediate subordinate entity. A diagram 900 shows an intermediate subordinate organization tree and a leaf subordinate organization tree linked to the intermediate subordinate organizational tree. The intermediate subordinate organization tree is comprised of a pair of linked hash trees. The first hash tree links a set of cryptographic keys and a second hash tree links a set of subordinate public keys. The set of cryptographic keys includes a first cryptographic key 902, a second cryptographic key 904, a third cryptographic key 906, and a fourth cryptographic key 908. The first cryptographic key 902 and the second cryptographic key 904 are combined and hashed to produce a first intermediate key hash 910. The third cryptographic key 906 and the fourth cryptographic key 908 are combined and hashed to produce a second intermediate key hash 912. The first intermediate key hash and the second intermediate key hash are combined and hashed to produce a subordinate public key 914 which is the root of the first hash tree. The second hash tree is built from public keys of subordinate signature authorities.

The leaf subordinate organization tree is comprised of a hash tree of cryptographic keys generated and managed by the leaf subordinate signature authority. A fifth cryptographic key 916 and a sixth cryptographic key 918 are combined and hashed to produce a subordinate public key 920 for the leaf subordinate signature authority. The leaf subordinate signature authority provides the subordinate public key 920 to the intermediate subordinate signature authority.

The subordinate intermediate subordinate signature authority receives subordinate public keys from a number of beef subordinate signature authorities and uses them to generate the second hash tree. A first subordinate public key 922 and a second subordinate public key 924 are combined and hashed to produce a subordinate public key 926 for the second hash tree. In various implementations the hash trees generated by the signature authorities may have different numbers of levels and different amounts of fanout based at least in part on the number of cryptographic keys and the number of subordinate signature authorities. The subordinate public key 914 of the first hash tree and a subordinate public key 926 of the second hash tree are combined and hashed to produce an organization public key 928. If the intermediate subordinate signature authority is a subordinate of a superior signature authority, the intermediate subordinate signature authority provides the organization public key 928 to the superior signature authority.

After determining the organization public key 928, the intermediate subordinate signature authority may provide at least a selection of nodes from the hash trees to the subordinate signature authorities so that subordinate signature authorities can verify digital signatures against the organization public key. In some examples, the intermediate subordinate signature authority publishes the intermediate subordinate organization tree. For example, a digital signature created using the third cryptographic key 906 may be verified against the organization public key 928 using public portions of the fourth cryptographic key 908, the first intermediate key hash 910, and the subordinate public key 926.

Figure 10:
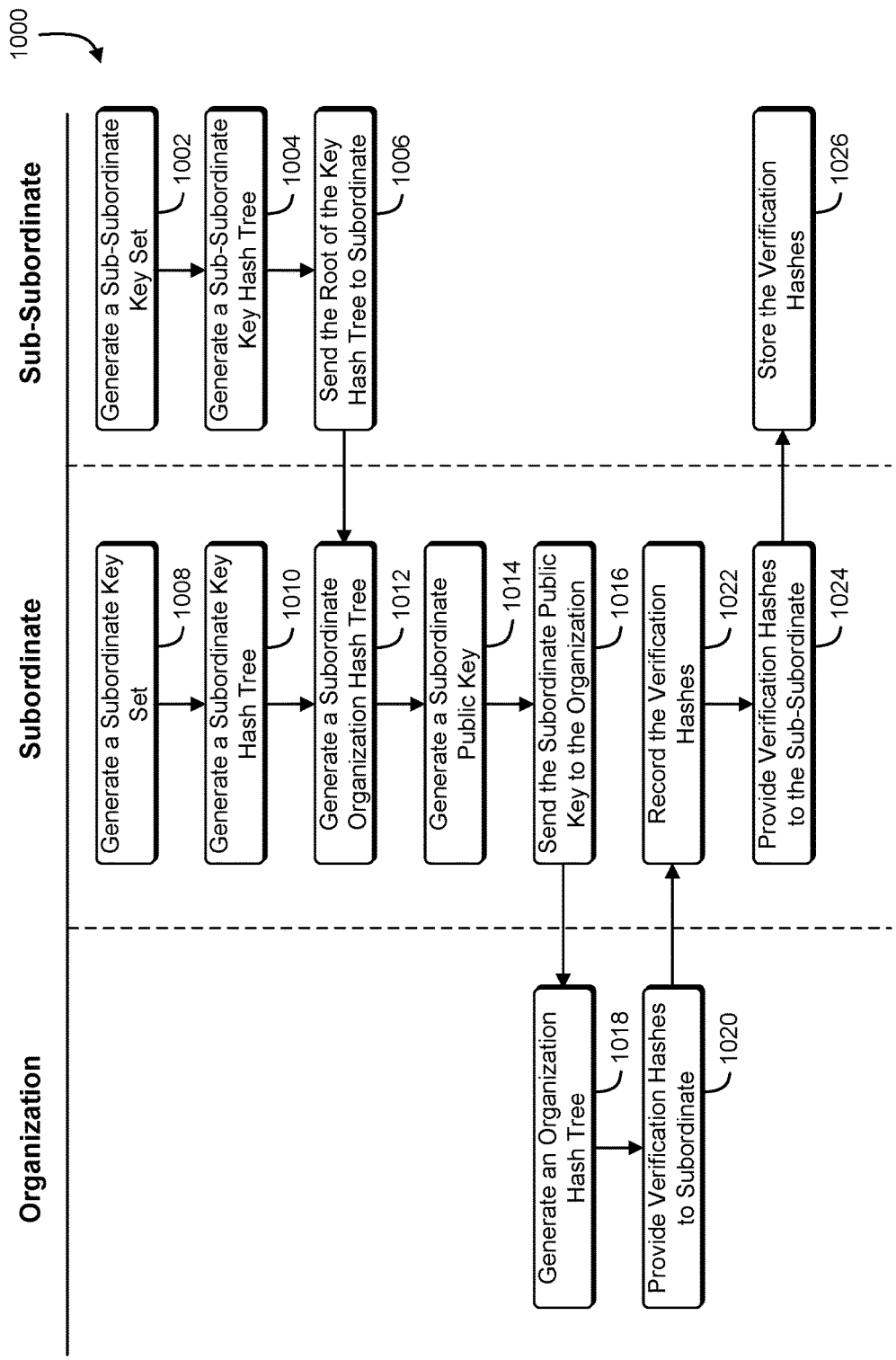
FIG. 10 shows an illustrative example of a process that, as a result of being performed by an organization computer system, a subordinate computer system, and a sub-subordinate computer system, generates a rollup hash tree that links public keys of the organization, the subordinate, and the sub-subordinate.

FIG. 10 shows an illustrative example of a process that, as a result of being performed by an organization computer system, a subordinate computer system, and a sub-subordinate computer system, generates a rollup hash tree that links public keys of the organization, the subordinate, and the sub-subordinate. A swim diagram 1000 illustrates a process that begins at block 1002 with the sub-subordinate signature authority generating a set of cryptographic keys for use by the sub-subordinate signature authority. The set of cryptographic keys may be a symmetric cryptographic keys or one-time-use cryptographic keys. The sub-subordinate signature authority generates 1004 a hash tree from the public portions of the set of cryptographic keys. The hash tree depth and fanout are based at least in part on the number of cryptographic keys in the set of cryptographic keys. The root of the hash tree serves as a public key for the sub-subordinate signature authority. At block 1006, the sub-subordinate signature authority sends the root of the hash tree (public key) to the subordinate signature authority.

The subordinate signature authority, at block 1008, generates its own set of cryptographic keys. At block 1010, the subordinate signature authority generates a corresponding hash tree for its set of cryptographic keys. At block 1012, the subordinate signature authority receives the public key of the sub-subordinate signature authority and combines the public key of the sub-subordinate signature authority with other public keys of other signature authorities that are subordinate to the subordinate signature authority by generating another hash tree. The root node of the hash tree generated from the cryptographic keys and the root of the hash node generated from the public keys of the sub-subordinate signature authorities are combined and hashed to produce a public key for the subordinate signature authority at block 1014. At block 1016, the public key of the subordinate signature authority is sent to an organizational signature authority.

The organizational signature authority receives the public key of the subordinate signature authority at block 1018, and the organizational signature authority combines the public key of the subordinate signature authority with the public keys of other subordinate signature authorities to generate a hash tree. The root of the hash tree serves as a public key for the organization. At block 1020, the organizational signature authority provides the public key and the intermediate hashes from the hash tree to the subordinate signature authority. In some implementations, the organizational signature authority provides selected intermediate hashes to individual subordinate signature authorities that are necessary to create a verification chain from the individual subordinate signature authority to the public key of the organization.

The subordinate signature authority receives the intermediate hashes from the organizational signature authority and records 1022 the information in an organizational database. The information in the organizational database may be provided to other entities to verify digital signatures against the public key of the organization. At block 1024, the subordinate signature authority identifies intermediate hashes and public keys maintained by the subordinate signature authority and provides the identified intermediate hashes and public keys to the sub-subordinate signature authority. In addition, intermediate hashes and public keys provided by the organizational signature authority to the subordinate signature authority may be provided by the subordinate signature authority to the sub-subordinate signature authority. The sub-subordinate signature authority receives and stores 1026 the intermediate hashes and public keys for later use in verifying digital signatures.

Figure 11:
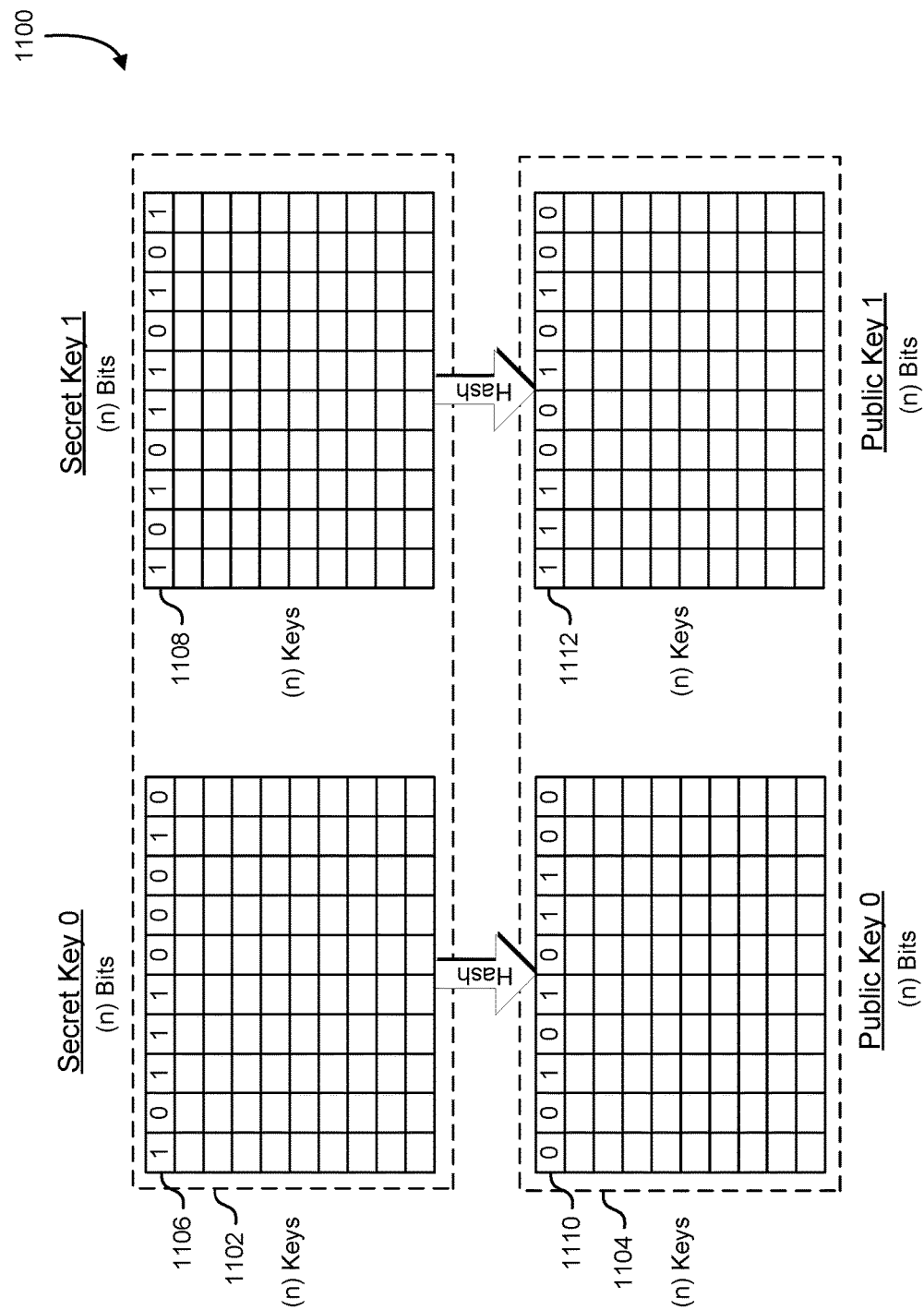
FIG. 11 shows an illustrative example of a one-time-use cryptographic key that includes secret key pairs and corresponding public key pairs.

FIG. 11 shows an illustrative example of a one-time-use cryptographic key that includes secret key pairs and corresponding public key pairs. A diagram 1100 shows a one-time-use key that is generated by a signature authority. The one-time-use key is comprised of a secret key pair 1102 and a public key pair 1104. The secret key pair 1102 includes a first secret key 1106 and a second secret key 1108. The first secret key 1106 and the second secret key 1108 each consist of a number (n) of n-bit keys. In some implementations, the first secret key 1106 and the second secret key 1108 are random numbers generated by the signature authority. In other implementations, the signature authority generates the first secret key 1106 and the second secret key 1108 from a secret seed value using a key derivation function ("KDF"). In some implementations, the secret seed value is itself generated from another secret seed value managed by the signature authority or owned by a superior signature authority.

The public key pair 1104 includes a first public key 1110 and a second public key 1112. The first public key 1110 and the second public key 1112 each include a number (n) of n-bit hashes that correspond to the keys of the first secret key 1106 and the second secret key 1108. Each n-bit key of the secret key pair 1102 is used to generate a corresponding n-bit hash of the public key pair 1104. For example, the hash of the first key of the first secret key 1106 is the first hash of the first public key 1110. Each hash is generated with a cryptographic hash function or one-way function $h(x)=y$ where y is easy to calculate for a given x, but x is computationally difficult to calculate for a given y. In some examples, SHA256, MD5, BLAKE, or BLAKE2 hash functions are used to generate the hashes. The public key pair 1104 is published by the signature authority.

Figure 12:
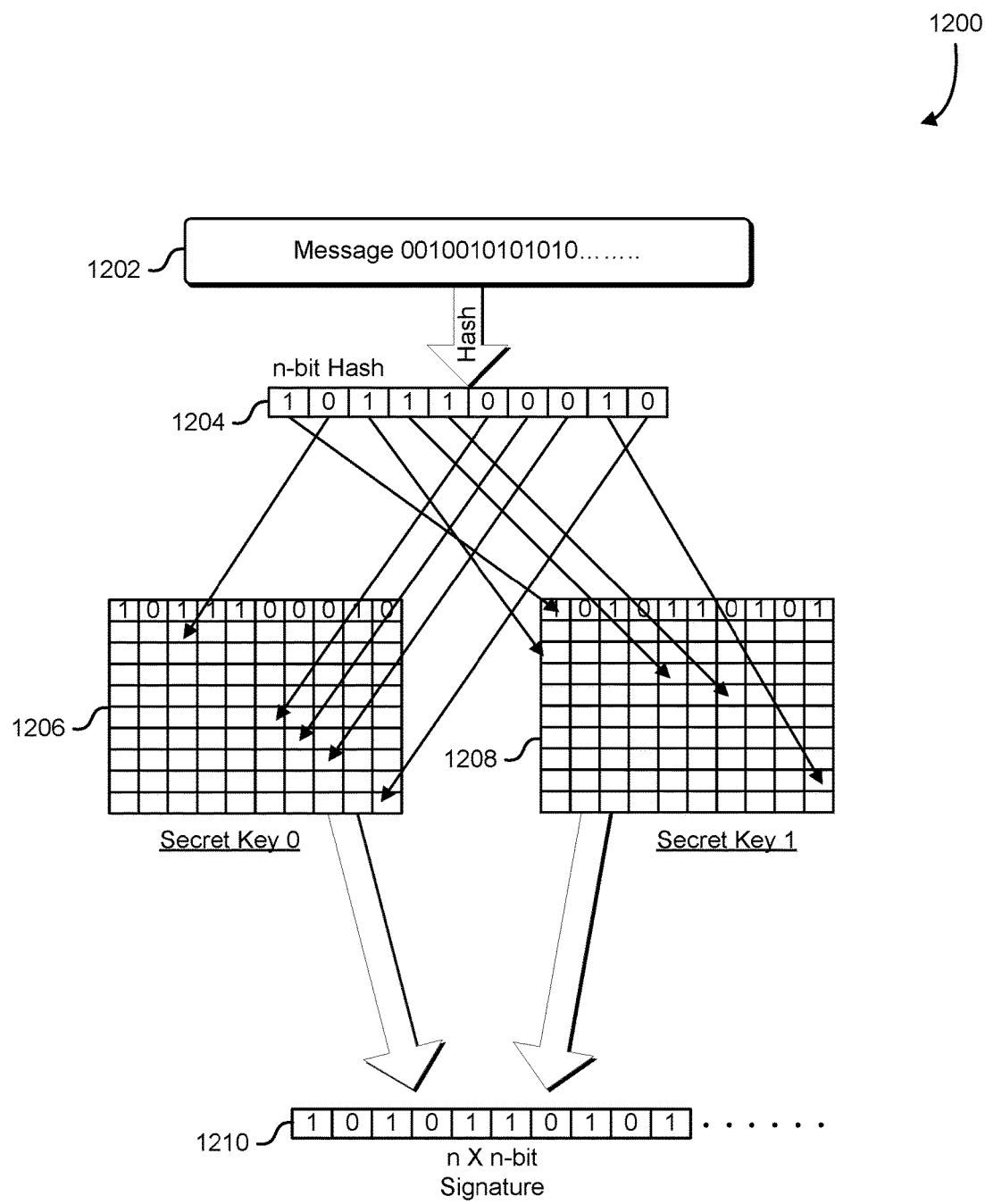
FIG. 12 shows an illustrative example of signing a message with a one-time-use cryptographic key.

FIG. 12 shows an illustrative example of signing a message with a one-time-use cryptographic key. A diagram 1200 illustrates the signing of a message 1202 by a signature authority using a one-time-use key. In various examples, the message 1202 may be a network packet, digital certificate, transactional record, media file, legal document, or other message submitted for signing by a requester. The signature authority receives the message 1202 from the requester and determines an n-bit message hash 1204 using a cryptographic hash function or other one-way function. A one-way function or cryptographic hash has the property that, for a given input, a hash value is relatively easy to calculate but, for a given hash value, an input that produces the given hash value is comparatively difficult. In various examples, cryptographic hash functions such as SHA-256, MD-5, or BLAKE may be used as the cryptographic hash function.

To sign the message 1202, the signature authority selects a one-time-use key for use in generating the digital signature. In some examples, if the signature authority has exhausted the supply of one-time-use keys, the signature authority reports an error and does not sign the message 1202. In other examples, if the signature authority has used the supply of one-time-use keys, a key may be selected for reuse. A particular cryptographic key may be selected for reuse based at least in part on the number of times the particular key has been reused and the particular secret keys used to generate previous signatures. In some implementations, the signature authority maintains a key-use database that records the number of times each key has been used and the digital signature generated with each key. In some examples, to locate a key for reuse, the signature authority may locate those keys that have been used the least number of times to generate digital signatures. In another example, the signature authority is provided with the message to be signed, and the signature authority identifies a cryptographic key for reuse that, when generating a digital signature for the message, reveals the lowest number of additional secret key portions of the available reusable cryptographic keys.

The one-time-use key includes a secret key pair that includes a first secret key 1206 and a second secret key 1208. For each bit (m) of the n-bit message hash 1204, the signature authority selects either the m'th key from the first secret key if the bit is a zero bit, or the m'th key from the second secret key if the bit is a one bit. The selected keys are concatenated to form a digital signature 1210 having n-squared bits. The digital signature 1210 is provided to the requester. In addition to the digital signature 1210, the requester is provided with public key information associated with the selected one-time-use key to support the verification of the digital signature 1210. The public key information may include one or more hashes of a hash tree or Merkel tree that link the public key information to a public key of the signature authority. For each bit of the n-bit message hash 1204, a secret key is chosen from either the first secret key 1206 or the second secret key. For 'zero' bits of the n-bit message hash 1204, a secret key corresponding to the bit in the n-bit message hash is selected from the first secret key 1206. For 'one' bits of the n-bit message hash 1204, a secret key corresponding to the bit in the n-bit message hash is selected from the second secret key 1208. The bit position within the n-bit message hash 1204 corresponds to the row (key number) within either the first secret key 1206 or second secret key 1208. In the example shown in FIG. 12, for each bit of the n-bit message hash, an arrow indicates the row of the particular secret key (having n-bits) which is added to the resulting digital signature 1210.

Figure 13:
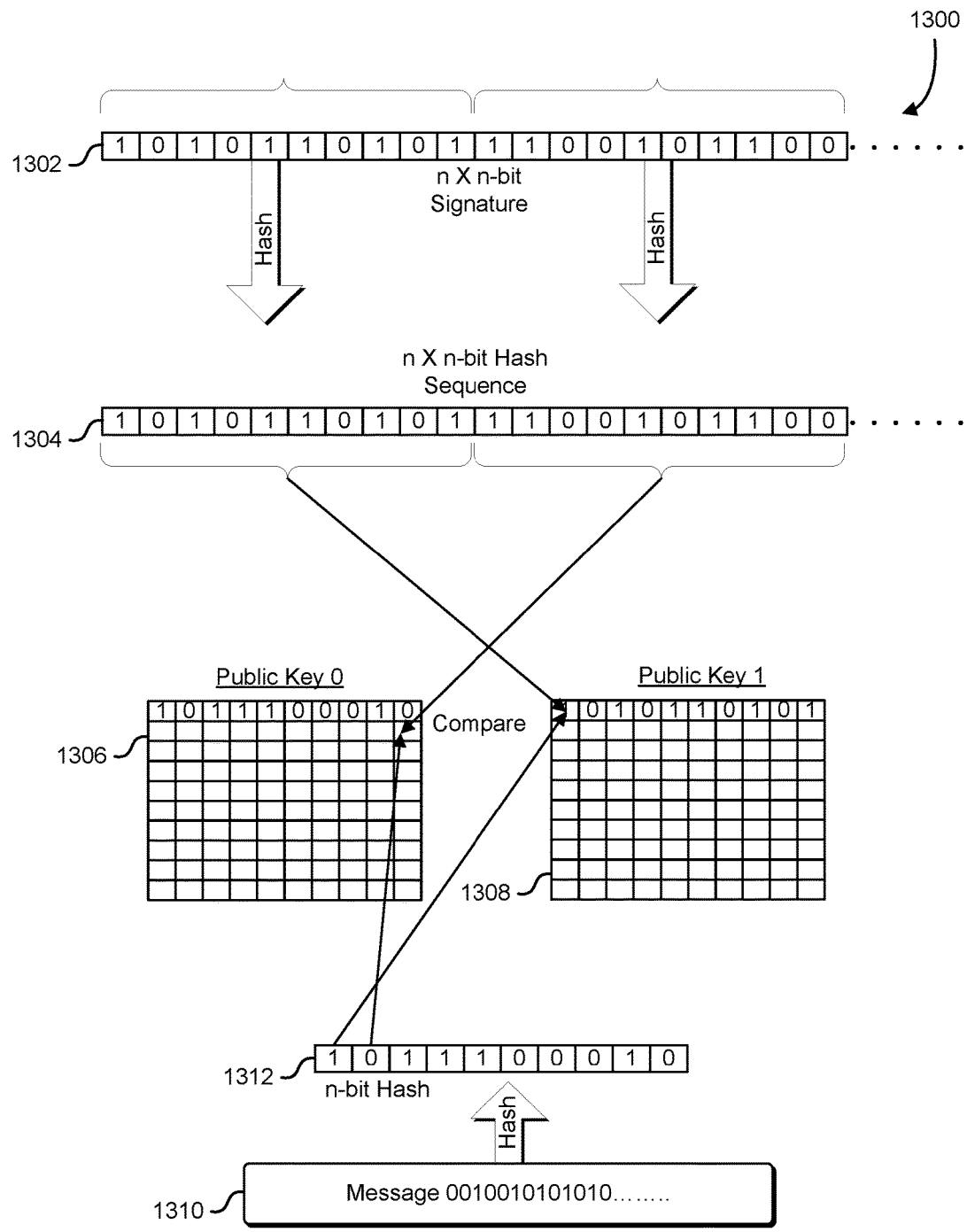
FIG. 13 shows an illustrative example of verifying a message with a one-time-use cryptographic key.

FIG. 13 shows an illustrative example of verifying a message with a one-time-use cryptographic key. A diagram 1300 illustrates how a recipient of a signed message is able to verify a digital signature. To verify the signed message, the recipient separates a digital signature 1302 from the signed message. The digital signature 1302 has n-squared bits, and the recipient divides the digital signature 1302 into n-key portions of n-bits each. The recipient determines a hash of each key portion and assembles the hashes into a hash sequence 1304 of n, n-bit hashes.

Using information provided with the digital signature, the recipient identifies the particular one-time-use-key used to generate the digital signature and requests related public key information from a signature authority. The signature authority provides the recipient with a public key pair corresponding to the one-time-use key used to generate the digital signature. The public key pair includes a first set of public keys 1306 and a second set of public keys 1308.

The recipient extracts a message body 1310 from the signed message and uses a cryptographic hash function to determine an n-bit message hash 1312 for the message body 1310. For each bit (m) of the n-bit message hash 1312, the recipient determines whether the bit is a one or zero. If the bit is a zero, the recipient compares the m'th key of the first set of public keys 1306 to the m'th hash of the hash sequence 1304. If the bit is a one, the recipient compares the m'th key of the second set of public keys 1308 to the m'th hash of the hash sequence 1304. If any of the comparisons do not match, the signature is not valid for the provided message. If the comparisons match, the signature is valid. In some implementations, additional verifications are performed to confirm that the public keys provided are in compliance with a Merkle tree or hash tree maintained by a signature authority. For each bit of the n-bit message hash 1312, a public key is chosen from either the first set of public keys 1306 or the second set of public keys 1308. For 'zero' bits of the n-bit message hash 1312, a public key corresponding to the bit in the n-bit message hash is selected from the first set of public keys 1306. For 'one' bits of the n-bit message hash 1312, a public key corresponding to the bit in the n-bit message hash 1312 is selected from the second set of public keys 1308. The bit position within the n-bit message hash 1312 corresponds to the row (key number) within either the first set of public keys 1306 or second set of public keys 1308. In the example shown in FIG. 13, for each bit of the n-bit message hash, an arrow indicates the row of the particular public key (having n-bits) that is compared to the hash sequence 1304.

Figure 14:
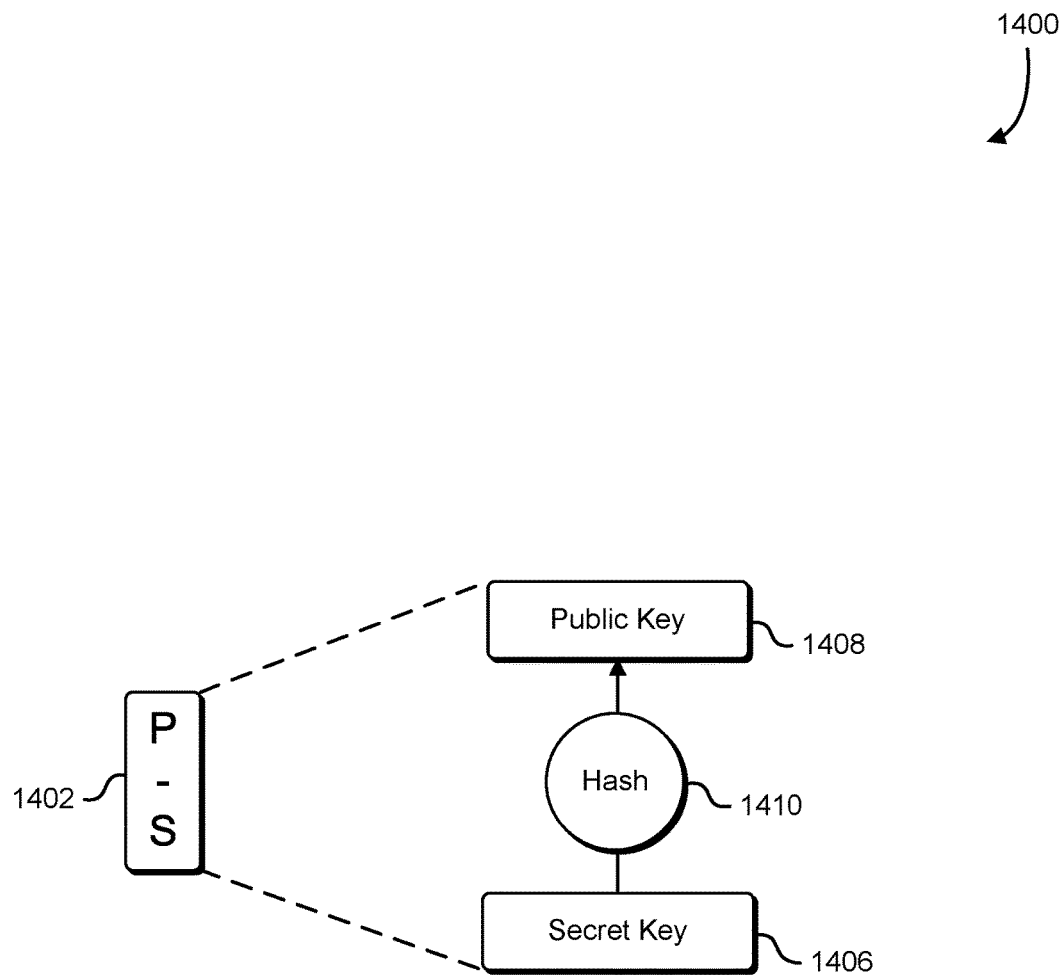
FIG. 14 shows an illustrative example of a secret key with an associated public key.

FIG. 14 shows an illustrative example of a secret key with an associated public key. A diagram 1400 shows a one-time-use cryptographic key 1402. The one-time-use cryptographic key 1402 comprises a secret key portion 1406 and a public key portion 1408 that is derived from the secret key portion 1406 using a hash function 1410 such as a cryptographic hash or one-way function. The one-time-use cryptographic key 1402 may be a key used in a Lamport signature scheme, a Winternitz signature scheme, or other one-time-use signature scheme using public and secret key pairs. In some implementations, the one-time-use cryptographic key 1402 is arranged in a hash tree, Merkle tree, or other structure where the public key portion 1408 is hashed with other public key portions of other one-time-use cryptographic keys into a single public key of a signature entity. In the following figures, the combination of the public key portion 1408 and the secret key portion 1406 may be represented as a public key/secret key pair.

Figure 15:
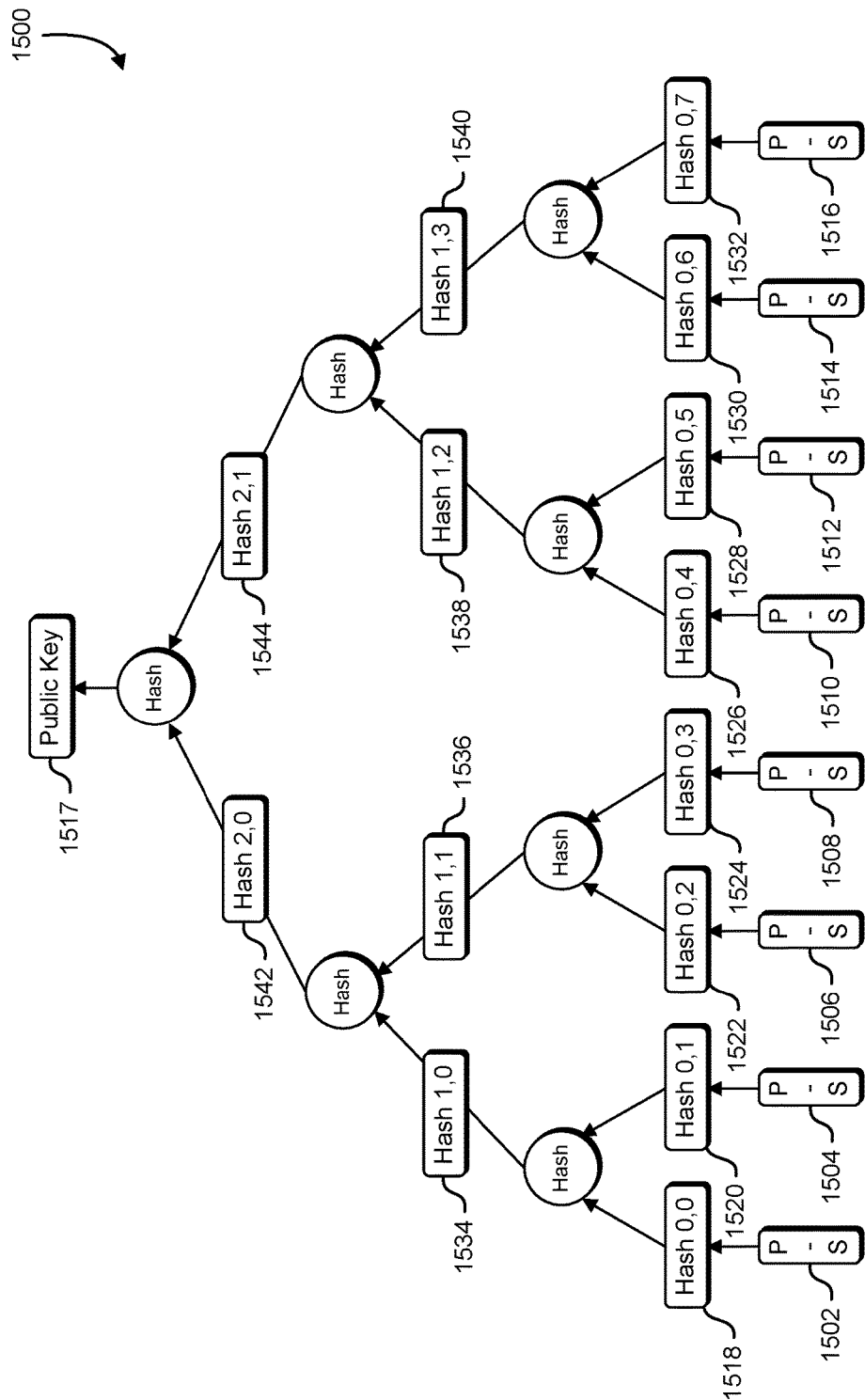
FIG. 15 shows an illustrative example of a Merkle tree of one-time-use cryptographic keys.

FIG. 15 shows an illustrative example of a Merkle tree of one-time-use cryptographic keys. A diagram 1500 shows a binary Merkle tree that links a collection of one-time-use cryptographic keys 1502, 1504, 1506, 1508, 1510, 1512, 1514, and 1516 to a public key 1517 associated with a signature authority. Each one-time-use cryptographic key is comprised of a secret key and a public key derived from the secret key using a cryptographic hash. In some examples, the secret key consists of n-pairs of n-bit secret keys, and the public key consists of n-pairs of n-bit hashes that correspond to the n-bit secret keys. The public keys are published by the signature authority, and the secret keys are maintained by the signature authority for use in generating digital signatures. A collection of corresponding level-0 hash nodes 1518, 1520, 1522, 1524, 1526, 1528, 1530, and 1532 is generated from the public keys of the one-time-use cryptographic keys. In some examples, each level-0 hash node is generated by taking a cryptographic hash of a public key of an associated one-time-use cryptographic key.

The level-0 hash nodes are incorporated into the Merkle tree. Pairs of level-0 hash nodes are combined using a cryptographic hash function to generate a set of four level-1 hash nodes 1534, 1536, 1538, and 1540. In the example shown in FIG. 15, hash 0,0 and hash 0,1 are concatenated and hashed to generate hash 1,0. Hash 0,2 and hash 0,3 are concatenated and hashed to generate hash 1,1. Hash 0,4 and hash 0,5 are concatenated and hashed to generate hash 1,2. Hash 0,6 and hash 0,7 are concatenated and hashed to generate hash 1,3. The four level-1 hash nodes are combined to generate two level-2 hash nodes 1542, and 1544. In the example shown in FIG. 15, hash 1,0 and hash 1,1 are concatenated and hashed to generate hash 2,0, and hash 1,2 and hash 1,3 are concatenated and hashed to generate hash 2,1. The level-2 hash nodes 1542 and 1544 are combined and hashed to produce the public key 1517. The public key 1517 is published by the signature authority so that recipients of a digital signature are able to confirm that the signature was generated with a one-time-use cryptographic key that is linked to the Merkle tree.

A recipient of a digital signature validates the signature using the public key information associated with the one-time-use cryptographic key used to generate the digital signature. The public key information is validated against the public key 1517 that is associated with a signature authority. The signature authority provides the recipient of the digital signature with the hash value nodes of the Merkle tree that are necessary to re-create the public key 1517 from the public key information.

For example, if the one-time-use cryptographic key 1506 is used to generate the digital signature, the public key information associated with the one-time-use cryptographic key 1506 is used to confirm that the digital signature was created from the secret key associated with the one-time-use cryptographic key 1506. The level-0 hash node 1522 can be re-created by the recipient using the public key information associated with the one-time-use cryptographic key 1506. In addition to the public key 1517, the signature authority provides the level-0 hash node 1524, the level-1 hash node 1534, and the level-2 hash node 1544. The recipient uses the determined level-0 hash node 1522 and the provided level-0 hash node 1524 to generate the level-1 hash node 1536. The recipient uses the generated level-1 hash node 1536 and the provided level-1 hash node 1534 to generate the level-2 hash node 1542. The generated level-2 hash node 1542 and the provided level-2 hash node 1544 are used to generate the public key 1517. If the generated public key matches the published public key provided by the signature authority, the one-time-use cryptographic key 1506 is a valid member of the Merkle tree. If the generated public key does not match the published public key, the one-time-use cryptographic key 1506 is not a valid member of the Merkle tree.

Figure 16:
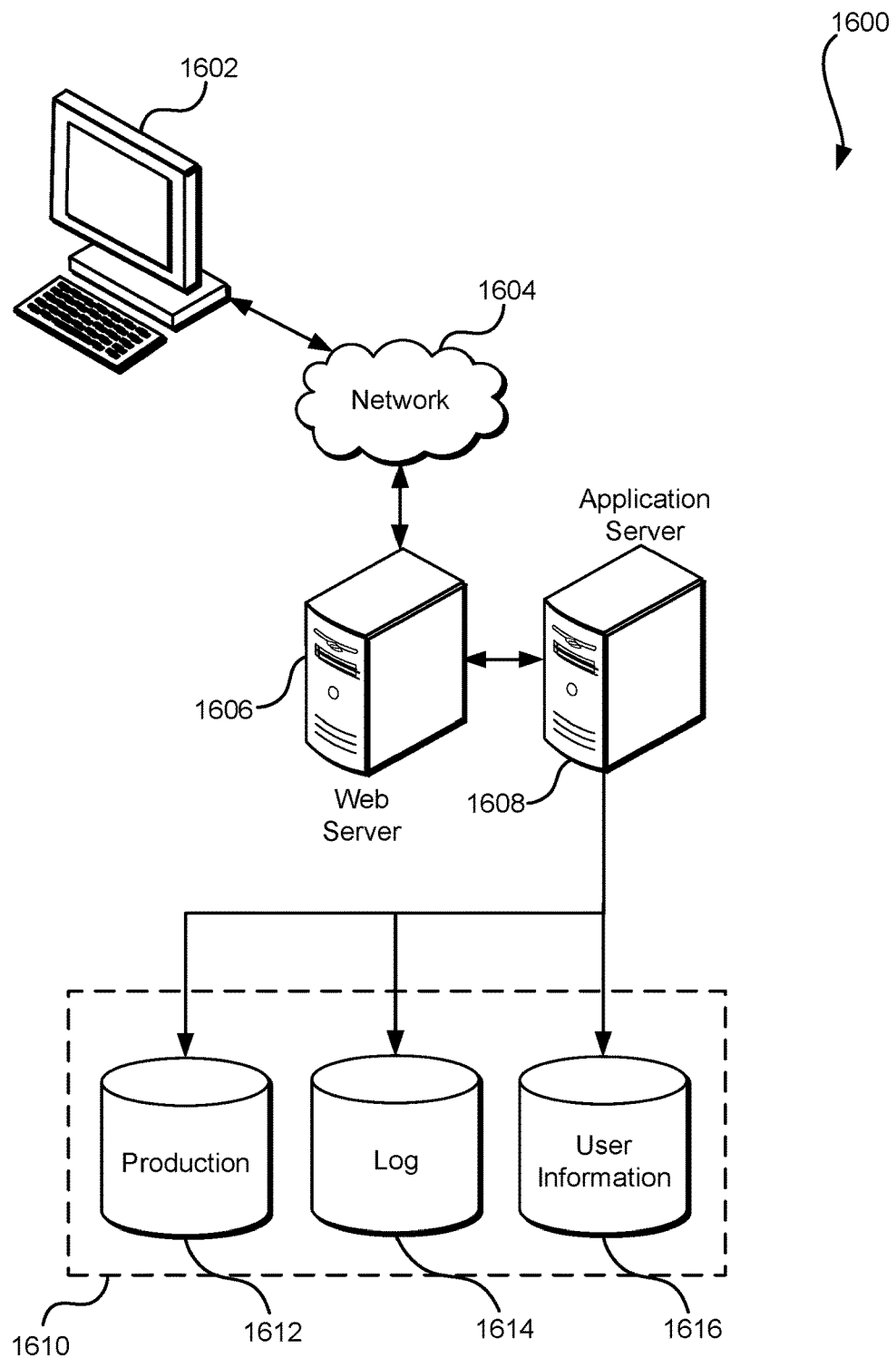
FIG. 16 illustrates an environment in which various embodiments can be implemented.

FIG. 16 illustrates aspects of an example environment 1600 for implementing aspects in accordance with various embodiments. As will be appreciated, although a web-based environment is used for purposes of explanation, different environments may be used, as appropriate, to implement various embodiments. The environment includes an electronic client device 1602, which can include any appropriate device operable to send and/or receive requests, messages, or information over an appropriate network 1604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1602 and the application server 1608, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1610 can include several separate data tables, databases, data documents, dynamic data storage schemes, and/or other data storage mechanisms and media for storing data relating to a particular aspect of the present disclosure. For example, the data store illustrated may include mechanisms for storing production data 1612 and user information 1616, which can be used to serve content for the production side. The data store also is shown to include a mechanism for storing log data 1614, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update, or otherwise process data in response thereto. The application server 1608 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Example, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, and Galois/Counter (GCM) mode.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. A value can be cryptographically derived using a one-way function. An encryption function can be (or can be a component of) a one-way function from the perspective of an entity that lacks information (e.g., cryptographic key and/or salt) used as input into the encryption function. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
  acquiring, at an organizational signature authority computer system, a collection of public keys of a corresponding collection of subordinate signature authority computer systems;
  generating a hash tree from the collection of public keys, the hash tree comprising a root node;
  creating a public key of the organizational signature authority computer system based at least in part on the root node;
  providing information selected from one or more nodes of the hash tree to a subordinate signature authority computer system in the collection of subordinate signature authority computer systems, the information allowing the subordinate signature authority computer system to generate a digital signature that is cryptographically verifiable using the public key of the organizational signature authority computer system, the information also allowing the subordinate signature authority computer system to regenerate the public key of the organizational signature authority computer system from a public key of the subordinate signature authority computer system; and making the public key of the organizational signature authority computer system available to an entity to use the public key to verify a digital signature.

2. The computer-implemented method of claim 1, wherein:
the hash tree is a binary tree; and
a depth of the binary tree is determined by a quantity of public keys in the collection of public keys.

3. The computer-implemented method of claim 1, wherein:
the information includes a fanout parameter of the hash tree that describes a number of child nodes for each internal node of the hash tree; and
the information includes a depth parameter of the hash tree that describes a number of levels between the root node and a leaf node of the hash tree.

4. The computer-implemented method of claim 1, wherein:
the organizational signature authority computer system is operated under authority of an organization;
the subordinate signature authority computer system is operated under authority of a subordinate organization within the organization; and
the subordinate signature authority computer system provides authentication information to the organizational signature authority computer system that proves that the subordinate signature authority computer system is operated under authority of the organization.

5. The computer-implemented method of claim 1, wherein at least one of the public keys comprises a root of a subordinate signature authority computer system hash tree.

6. A system, comprising:
a computer system that includes a processor; and
memory containing executable instructions that, as a result of execution by the processor, cause the system to:
acquire a collection of public keys, individual public keys of the collection of public keys generated by one or more subordinate signature authority computer systems from cryptographic keys used by the subordinate signature authority computer systems;
cryptographically derive a hash tree from the collection of public keys;
generate a public key of the computer system from a root node of the hash tree;
for a particular computer system in the one or more subordinate signature authority computer systems, identify a set of hashes from one or more nodes of the hash tree that, as a result of being provided to the particular computer system, allow the particular computer system to regenerate the public key of the computer system from a public key of the particular computer system; and
provide the set of hashes to the particular computer system.

7. The system of claim 6, wherein the system further:
provides information that describes fanout and depth of the hash tree to the particular computer system; and
provides information that describes a location of the public key of the particular computer system within the hash tree.

8. The system of claim 6, wherein the set of hashes consists of:

a set of hash-tree nodes between the public key of the particular computer system and the root of the hash tree;
child nodes of the set of nodes between the public key of the particular computer system and the root of the hash tree; and
the root of the hash tree and children of the root of the hash tree.

9. The system of claim 6, wherein the individual public keys comprise a root of a subordinate signature authority computer system hash tree including the cryptographic keys.

10. The system of claim 6, wherein the system further:
generates a set of cryptographic keys;
generates an additional hash tree from the set of cryptographic keys; and
cryptographically derives the public key of the computer system from a combination of the root of the additional hash tree and the root of the hash tree.

11. The system of claim 10, wherein:
the set of cryptographic keys is a set of one-time-use cryptographic keys;
each one-time-use cryptographic key in the set of one-time-use cryptographic keys includes a public key and a secret key; and
the additional hash tree is cryptographically derived from public keys of the set of one-time-use cryptographic keys.

12. The system of claim 11, wherein the system further:
provides the public key of the computer system to a superior signature authority computer system; and
receives information from the superior signature authority computer system that allows a digital signature generated with one of the set of one-time-use cryptographic keys to be verified with a public key of the superior signature authority.

13. The system of claim 6, wherein:
a non-leaf node of the hash tree is created by taking a cryptographic hash of a combination of values associated with child nodes of the non-leaf node; and
the leaf nodes of the hash tree are generated from the collection of public keys.

14. The system of claim 13, wherein the combination of values is created by concatenating the values associated with child nodes of the non-leaf node.

15. A non-transitory computer-readable storage medium comprising executable instructions that, as a result of being executed by one or more processors of a computer system, cause the computer system to at least:
acquire, by a signature authority computer system, a collection of public keys, individual public keys of the collection of public keys generated by one or more subordinate signature authority computer systems from one-time use cryptographic keys used by the subordinate signature authority computer systems;
cryptographically derive a hash tree from the collection of public keys;
generate a public key of the computer system from a root node of the hash tree;
for a particular computer system in the one or more subordinate signature authority computer systems, identify a set of hashes from one or more nodes of the hash tree that, as a result of being provided to the particular computer system, allow the particular computer system to regenerate the public key of the signature authority computer system from a public key of the particular computer system; and provide the set of hashes to the particular computer system.

16. The non-transitory computer-readable storage medium of claim 15 wherein the instructions further comprise instructions that, as a result of being executed by the one or more processors, cause the computer system to:
   generate a set of cryptographic keys;
   generate an additional hash tree from the set of cryptographic keys; and
   cryptographically derive the public key of the computer system from a combination of the root of the additional hash tree and the root of the hash tree.

17. The non-transitory computer-readable storage medium of claim 15 wherein the instructions further comprise instructions that, as a result of being executed by the one or more processors, cause the computer system to:
   provide information that describes fanout and depth of the hash tree to the particular computer system; and
   provide information that describes a location of the public key of the particular computer system within the hash tree.

18. The non-transitory computer-readable storage medium of claim 15, wherein the set of hashes consists of:
   a set of hash-tree nodes between the public key of the particular computer system and the root of the hash tree;
   child nodes of the set of nodes between the public key of the particular computer system and the root of the hash tree; and
   the root of the hash tree and children of the root of the hash tree.

19. The non-transitory computer-readable storage medium of claim 15, wherein the individual public keys comprise a root of a subordinate signature authority computer system hash tree including the cryptographic keys.

20. The non-transitory computer-readable storage medium of claim 15 wherein:
   the set of cryptographic keys is a set of one-time-use cryptographic keys;
   each one-time-use cryptographic key in the set of one-time-use cryptographic keys includes a public key and a secret key; and
   the additional hash tree is cryptographically derived from public keys of the set of one-time-use cryptographic keys.

21. The non-transitory computer-readable storage medium of claim 20 wherein the instructions further comprise instructions that, as a result of being executed by the one or more processors, cause the computer system to:
   provide the public key of the computer system to a superior signature authority computer system; and
   receive information from the superior signature authority computer system that allows a digital signature generated with one of the set of one-time-use cryptographic keys to be verified with a public key of the superior signature authority.

22. The non-transitory computer-readable storage medium of claim 15 wherein:
   a non-leaf node of the hash tree is created by taking a cryptographic hash of a combination of values associated with child nodes of the non-leaf node; and
   the leaf nodes of the hash tree are generated from the collection of public keys.

23. The non-transitory computer-readable storage medium of claim 22 wherein the combination of values is created by concatenating the values associated with child nodes of the non-leaf node.

* * * * *